(12) United States Patent
Laskoski et al.

(10) Patent No.: US 7,897,715 B1
(45) Date of Patent: Mar. 1, 2011

(54) COPOLYMERS AND CERAMIC-CARBONACEOUS SOLIDS FROM DIVINYL AROMATIC ETHER OLIGOMERS AND DIVINYL CARBORANE SILOXANE

(75) Inventors: Matthew Laskoski, Springfield, VA (US); Teddy M Keller, Fairfax Station, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/758,203

(22) Filed: Apr. 12, 2010

(51) Int. Cl.
*C08G 77/04* (2006.01)

(52) U.S. Cl. .............. 528/25; 528/5; 528/127

(58) Field of Classification Search ............ 528/25
See application file for complete search history.

(56) References Cited

U.S. PATENT DOCUMENTS

| | | |
|---|---|---|
| 5,272,237 A | 12/1993 | Keller et al. |
| 5,969,072 A | 10/1999 | Keller et al. |
| 5,981,678 A | 11/1999 | Keller et al. |
| 6,225,247 B1 | 5/2001 | Keller et al. |
| 7,153,921 B2 * | 12/2006 | Keller et al. ............ 528/5 |
| 7,238,766 B2 | 7/2007 | Keller et al. |
| 7,605,218 B2 | 10/2009 | Keller et al. |
| 7,655,738 B2 | 2/2010 | Keller et al. |
| 7,772,355 B2 * | 8/2010 | Laskoski et al. ............ 528/127 |
| 2009/0192272 A1 | 7/2009 | Laskoski et al. |
| 2010/0022693 A1 | 1/2010 | Laskoski et al. |

OTHER PUBLICATIONS

U.S. Appl. No. 12/427,084, filed Apr. 21, 2009.

* cited by examiner

*Primary Examiner*—Randy Gulakowski
*Assistant Examiner*—Lindsay Nelson
(74) *Attorney, Agent, or Firm*—Amy L. Ressing; Joseph T. Grunkemeyer

(57) ABSTRACT

A method and product thereof made by: reacting a carborane-containing compound and an aromatic compound (below) with a crosslinker having at least two silyl hydrogen atoms. R is alkyl, aryl, alkylaryl, haloalkyl, or haloaryl group. $C_b$ is a divalent carboranyl group. U is an unsaturated hydrocarbon group. $Ar^1$ and $Ar^2$ are each a first aromatic group or a bisphenol residue, where at least one of $Ar^1$ and $Ar^2$ is the first aromatic group. Each Ar is a second aromatic group. Each n is a nonnegative integer. The values n' and n" are positive integers and m, w, x, y, and z are 0 or 1. If y is 0 than x and z are 0 and w is 1, and if y is 1 than x and z have different values and w equals z.

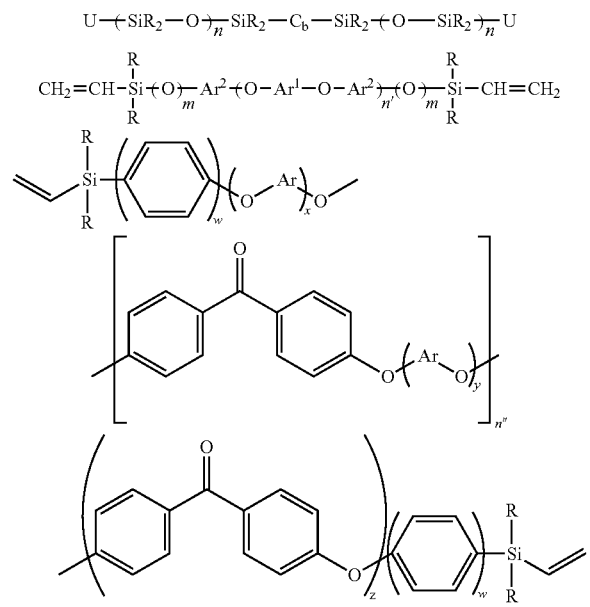

20 Claims, 3 Drawing Sheets

COPOLYMERS AND CERAMIC-CARBONACEOUS SOLIDS FROM DIVINYL AROMATIC ETHER OLIGOMERS AND DIVINYL CARBORANE SILOXANE

TECHNICAL FIELD

The present disclosure is generally related to siloxane- and aromatic ether-containing polymers.

DESCRIPTION OF RELATED ART

The rapid advancement of modern technology in recent years has increasingly demanded new high performance materials for use in a wide variety of engineering applications and under unusual service conditions. High temperature elastomers/plastics that have thermal, thermo-oxidative and hydrolytic stability above 300° C. and also maintain flexibility and other desirable physical properties to well below ambient temperature are in demand for numerous marine and aerospace applications. For example, high temperature tough elastomers/plastics are needed for high voltage electrical cables for advanced ships. Elastomers are highly desirable for components in high flying airplanes and space vehicles, which experience extreme variations of temperatures from as low as −50° C. to as high as 300-450° C. Lightly crosslinked elastomers or networked systems would also be desirable for high temperature integral fuel tank sealants, which require long lasting elastomers (up to 10,000 hours) for use from −60° C. to 400° C. without swelling on contact with jet fuels but with excellent adhesion and inertness toward metallic substrates. High temperature elastomers could also be useful as coatings on towlines for aircraft decoy counter measures.

BRIEF SUMMARY

Disclosed herein as a method and product thereof comprising: providing one or more carborane-containing compounds, providing one or more aromatic compounds, and reacting the carborane-containing compound and the aromatic compound with one or more crosslinkers having at least two silyl hydrogen atoms. The carborane-containing compound has the formula shown in Eq. (1). The aromatic compound has the formula shown in Eqs. (2) or (3). Each R is an independently selected alkyl, aryl, alkylaryl, haloalkyl, or haloaryl group. $C_b$ is a divalent carboranyl group. Each U is an independently selected unsaturated hydrocarbon group. $Ar^1$ and $Ar^2$ are each selected from a first aromatic group and a bisphenol residue, where at least one of $Ar^1$ and $Ar^2$ is the first aromatic group. Each Ar is an independently selected second aromatic group. Each n is an independently selected nonnegative integer. The values n' and n'' are independently selected positive integers and m, w, x, y, and z are each independently selected from 0 and 1. If y is 0 than x and z are 0 and w is 1, and if y is 1 than x and z have different values and w equals z.

(1)

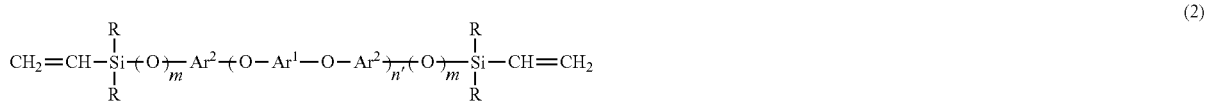

(2)

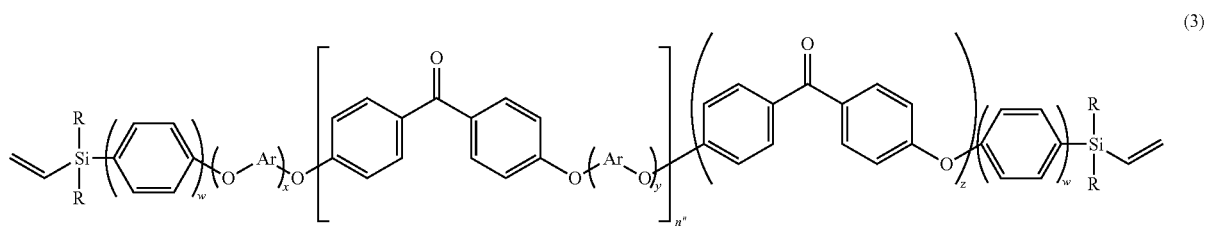

(3)

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

The present disclosure is related to a precursor composition formulated from various mixtures of divinyl-terminated multiple aromatic ether-containing oligomeric resins with carborane compounds such as 1,7-bis(vinyltetramethyldisiloxyl)-m-carborane, the polymerization of the mixtures to high temperature elastomers, plastics, and coatings, and conversion to ceramic carbonaceous solids at temperatures above 500° C. As synthesized, both monomers (divinyl-terminated multiple aromatic ether-containing oligomeric resins) and 1,7-bis(vinyltetramethyldisiloxyl)-m-carborane) may be clear liquids. Mixtures of the oligomeric resins and 1,7-bis(vinyltetramethyldisiloxyl)-m-carborane can be converted to high temperature clear elastomers and plastics at room temperature and at temperatures in excess of 100° C. respectively. High temperature, tough, and clear elastomers/plastics that can be processed under ambient conditions do not exist today. The divinyl terminated oligomeric resins are composed primarily of aromatic ether units with varying lengths, which may affect the physical properties of the resulting copolymers. Since both the divinyl terminated oligomers and 1,7-bis(vinyltetramethyldisiloxyl)-m-carborane are liquids, are miscible in each other, and are soluble in most organic solvents, the precursor compositions may be easily fabricated into shaped components or can be deposited as a film or onto fibrous materials as coatings in the presence of a curing additive. Polymerization can be achieved under ambient condition by hydrosilylation reactions, which involve the interaction of a curing additive containing multiple —SiH units with the vinyl terminated units in the presence of a catalyst. The incorporation of the aromatic units within the backbone of the oligomeric resins enhances the stiffness, mechanical, thermal, and oxidative properties of the networked copolymers fabricated from the precursor mixtures.

Figure 1:
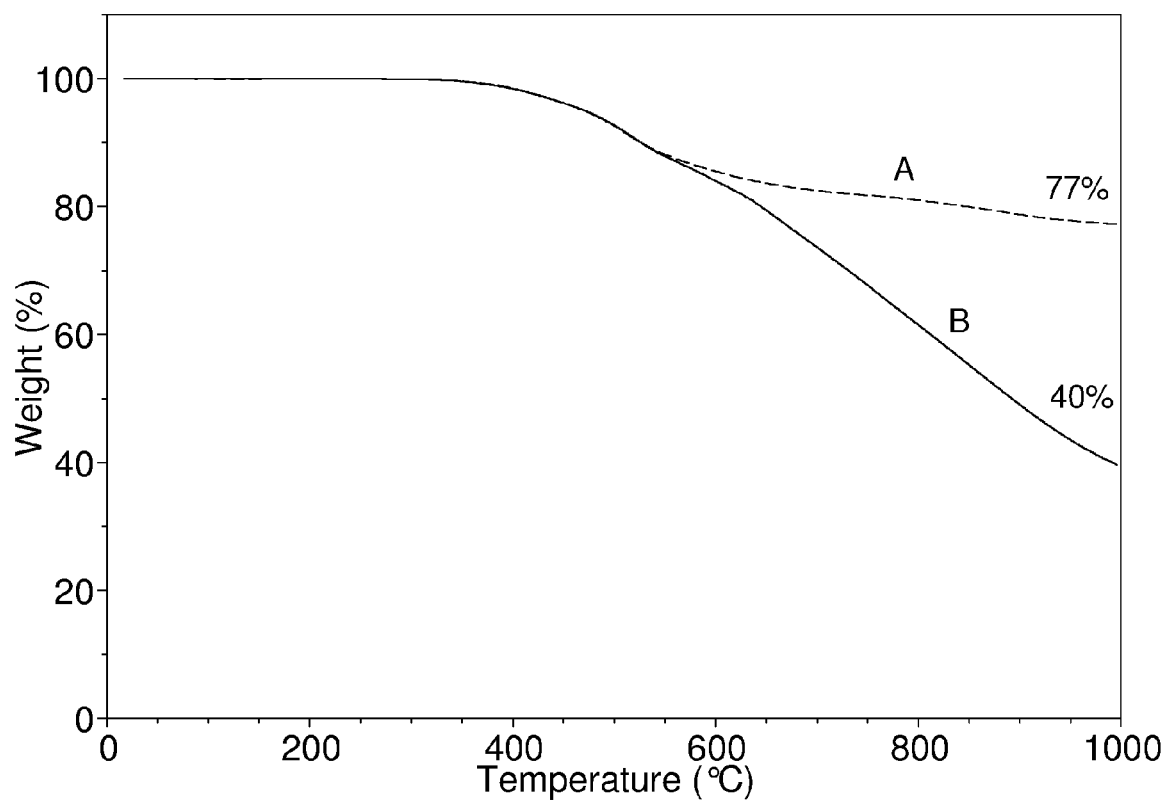
FIG. 1 shows TGA thermograms of a bisphenol A/benzophenone vinyl silane cured with CL-4 with and without 10% carborane vinyl siloxane (post cured to 300° C. for 1 h) heated under air (A) with 10% carborane vinyl siloxane and (B) without carborane.

The divinyl-terminated oligomeric resins and 1,7-bis(vinyltetramethyldisiloxyl)-m-carborane can be polymerized through the terminal vinyl groups to afford high temperature, flame resistant elastomers and networked or crosslinked plastics. Depending on the structure of the silane-containing compound, the amount of curing additive and the curing temperature, soft-to-hard clear elastomers (rubbers) or plastics can be obtained. The flame resistant and high temperature properties of the copolymers can be varied by the amount of 1,7-bis(vinyltetramethyldisiloxyl)-m-carborane and divinyl terminated oligomeric resins used to formulate the precursor mixture. By the usage of just 10% of 1,7-bis(vinyltetramethyldisiloxyl)-m-carborane, the char yield of the resulting mixture under air is improved by nearly 100% (FIG. 1). Polymeric coatings or composites formulated from the oligomeric aromatic ether-containing divinyl terminated resins and 1,7-bis(vinyltetramethyldisiloxyl)-m-carborane may have outstanding thermo-oxidative and flammability properties for potential military (ship, submarine, aerospace) and domestic applications and can withstand continuous high temperatures (300-500° C.) in oxidative environments such as air for extended periods. The use of low molecular weight precursor resins to obtain thermosetting polymeric materials with high thermo-oxidative properties is often advantageous from a processing standpoint. Additionally, these copolymers, after being converted to ceramic-carbonaceous compositions above 500° C., may have outstanding thermal and oxidative properties with maximum use temperatures at least to 1500° C.

Figure 2:
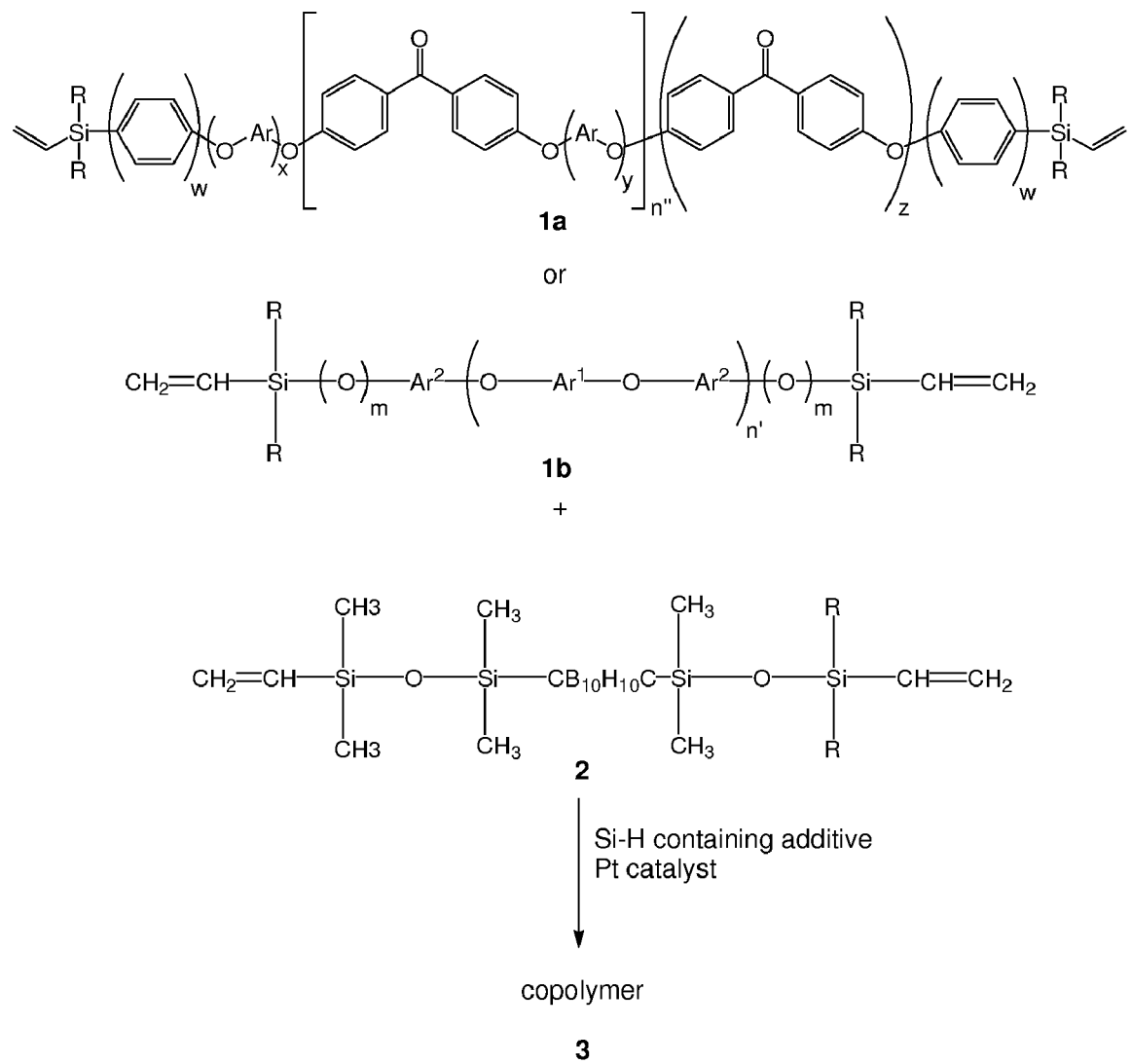
FIG. 2 shows the general preparation of copolymers of divinyl terminated oligomeric resins 1 and 1,7-bis(vinyltetramethyldisiloxyl)-m-carborane 2 to form copolymer 3.

It is desirable to design and prepare clear elastomers and plastics from oligomeric divinyl terminated resins and 1,7-bis(vinyltetramethyldisiloxyl)-m-carborane, which will retain useful thermo-oxidative properties. The copolymers can show outstanding and superior thermo-oxidative properties (FIG. 1). FIG. 2 shows the general procedure for the combination of 1 and 2 and conversion to elastomer and/or plastic 3. During the preparation of copolymer 3, the oligomeric divinyl terminated resins and 1,7-bis(vinyltetramethyldisiloxyl)-m-carborane are mixed in a minimal amount of toluene in various ratios. The desired curing additive or combinations of curing additives (FIG. 2) are then added and the resulting mixtures are cured in the presence of a Pt catalyst. The progress of the reaction may be monitored by IR spectroscopy.

Changing any of the reactants and variables mentioned above can lead to the formation of either elastomeric or hard plastic thermosets 3 of differing physical properties. Reaction of 1 and 2 with any compound (curing additive) containing multiple —SiH units may lead to clear amber colored copolymer 3. Thus, it is possible to tailor the cured copolymer 3 according to specific needs. The resulting copolymer 3 may exhibit outstanding thermal and oxidative properties to about 400° C.

It is possible to form linear elastomeric copolymers or controlled limited networked copolymeric systems by the use of curing additive containing two —SiH units or a combination of two —SiH units and some multiple —SiH units. The physical properties of the resulting elastomeric copolymers will depend on the amount of each of the silane based compounds (two —SiH and multiple —SiH units) used in the polymerization reaction.

The carborane-containing compound contains a carborane moiety, two silane or siloxane moieties, and two unsaturated hydrocarbon groups. Such compounds are described in U.S. Pat. No. 7,238,766. (All publications and patent documents referenced throughout this application are incorporated herein by reference.) A suitable carboranyl group is —$CB_{10}H_{10}C$—, commonly known as carborane, which occurs in o-(1,2-), m-(1,7-), and p-(1,10-) forms. A suitable R group is, but is not limited to, methyl. Suitable U groups include, but are not limited to, an ethenyl group, an ethynyl group, and a diacetylene group. A suitable value for each n is, but is not limited to, 1. Examples of the carborane-containing compound include, but are not limited to, 1,7-bis(vinyltetramethyldisiloxyl)-m-carborane and bis(ethynyltetramethyldisiloxyl)-m-carborane. More than one carborane-siloxane precursor can also be used.

The carborane-containing compound may be made be reacting a lithium-terminated oligomer with an excess of chlorine-terminated oligomer, followed by reacting with vinylmagnesium bromide or ethynylmagnesium bromide. Each oligomer may contain acetylene, siloxanes, and/or carboranes, including only one such group. By using an excess of chlorine-terminated oligomer, the resulting compound is also chlorine-terminated. Alternatively, the chlorine-terminated oligomer may be used without reacting with the lithium-terminated oligomer. Reaction with vinylmagnesium bromide or ethynylmagnesium bromide removes the chlorine and adds vinyl or ethynyl groups as the U groups. Suitable oligomers include, but are not limited to, 1,4-dilithiobutadiyne, chlorine-terminated siloxane-carborane oligomers, lithium-terminated siloxane-carborane oligomers, chlorine-terminated siloxane-acetylene oligomers, and chlorine-terminated siloxane-carborane-acetylene oligomers. Examples of such oligomers and their formation may be found in Keller et al., U.S. Pat. No. 5,272,237, and Keller et al., U.S. Pat. No. 5,981,678.

Suitable members of one group of the aromatic compounds (Eq. (2)) are described in US Patent Application Publication No. 2010/0022693. Generally, this aromatic compound may be made by any reaction of a dibromoaromatic or diiodoaromatic with a bisphenol or a dihydroxyaromatic. The aromatic groups may be any divalent substituted or unsubstituted, fused or non-fused aromatic groups including, but not limited to, phenylene and naphthylene. The term "bisphenol residue" refers to the moiety incorporated into the oligomer when the hydrogen atoms of the hydroxyl groups of the bisphenol are removed in the reaction with the dibromo- or diiodoaromatic. When the bisphenol or dihydroxyaromatic is in excess, the value of m (in Eq. (2)) is 1. When, for example, the dibromoaromatic or diiodoaromatic is in excess, the value of m is zero. When the ratio of the two reactants is 2:1, the average value of n' is 1. The value of n' increases as the ratio approaches 1:1. The oligomer may have any length and the reaction product will generally have more than one compound formed during the synthesis with the average molecular weight dependent on the ratios of reactants used. The mixture may also include a compound containing single repeat unit of one reactant and none of the other. The compound may then be reacted with vinyl(dimethylchlorosilane) to form the compound of Eq. (2). Examples of oligomers are shown in Eqs. (4)-(6). X may be H or F.

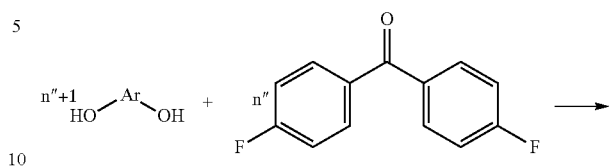

(7)

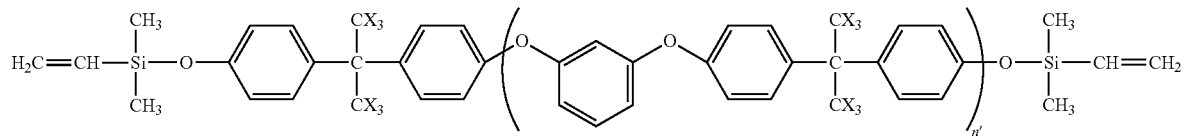

(4)

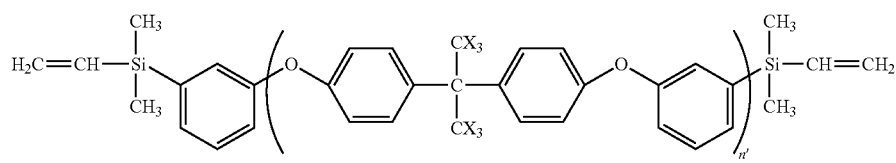

(5)

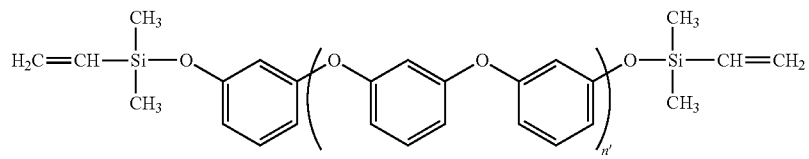

(6)

Suitable members of the other group of aromatic compounds (Eq. (3)) are described in US Patent Application Publication No. 2009/0192272. One method for making the disclosed compounds is to react a 4,4'-difluorobenzophenone with an aromatic diol to form an oligomer. The oligomer may have any length and the reaction product will generally have more than one compound formed during the synthesis with the average molecular weight dependent on the ratios of reactants used. The mixture may also include a compound containing single repeat unit of one reactant and none of the other. The reaction may be a nucleophilic reaction in the presence of $K_2CO_3$, N,N-dimethylformamide (DMF), and toluene. This mixed solvent system allows the azeotropic distillation of the water formed as a by-product in the reaction at temperatures between 135 and 145° C. Either the aromatic diol or the 4,4'-difluorobenzophenone may be present in stoichiometric excess so that the oligomer is terminated by the excess reactant. Reaction with excess diol is shown in Eq. (7) and excess benzophenone is shown in Eq. (8). Suitable diols include, but are not limited to, 4,4'-dihydroxy-2,2-diphenylpropane (bisphenol A); 1,1,1,3,3,3-hexafluoro-4,4'-dihydroxy-2,2-diphenylpropane (bisphenol A6F); biphenol; and resorcinol.

-continued

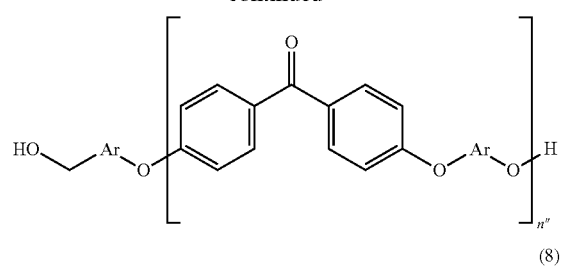

(8)

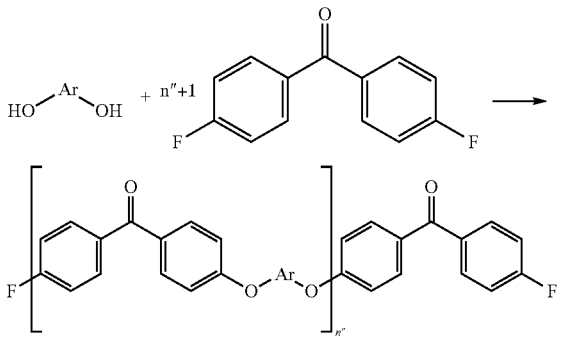

The oligomer may then be reacted with a vinyl dialkylsilane to add terminal vinyl silyl groups to the oligomer. When terminal diol is used, a chlorovinylsilane is used as in Eq. (9), and the reaction may be performed in the presence of triethylamine and THF. When terminal benzophenone is used, a vinylsilylphenol is used as in Eq. (10), and the reaction may be performed in situ with Eq. (8). Any unreacted benzophenone may also be vinylsilyl terminated as shown in Eq. (11). The possible combinations for the values of w, x, y, and z in Eq. (3) are (0, 1, 1, 0), (1, 0, 0, 0), and (1, 0, 1, 1).

ylsiloxy)silane; methyl tris(dimethylsiloxy)silane; phenyl tris(dimethylsiloxy)silane; bis[(p-dimethylsilyl)phenyl] ether; diphenylsilane; 1,1,3,3-tetramethyldisiloxane; 1,1,3,3,5,5,7,7-octamethyltetrasiloxane; a hydride-terminated polydimethylsiloxane; a polyhedral oligomeric silsesquioxane having pendent silyl hydrogens; $((SiH(CH_3)_2O)SiO_{1.5})_8$; or $(HSiO_{1.5})_8$. These compounds are shown below. Such crosslinkers may be commercially available. More than one siloxane crosslinker can also be used. The polyhedral oligomeric silsesquioxanes and their reaction with vinyl compounds are described in U.S. Pat. No. 7,655,738 and U.S. patent application Ser. No. 12/427,084.

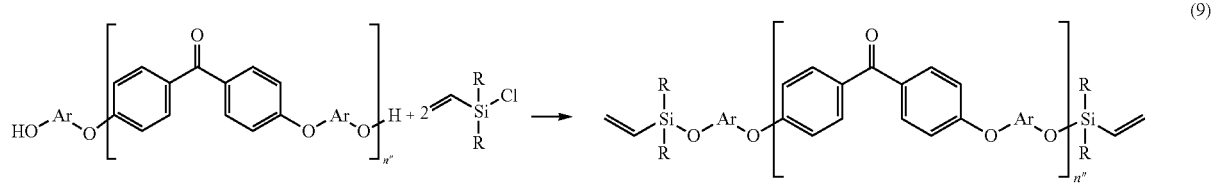

(9)

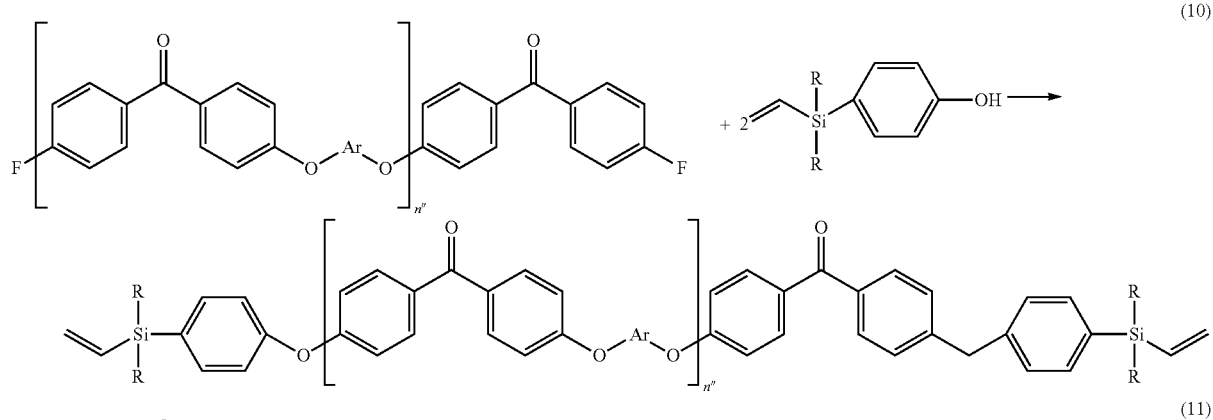

(10)

(11)

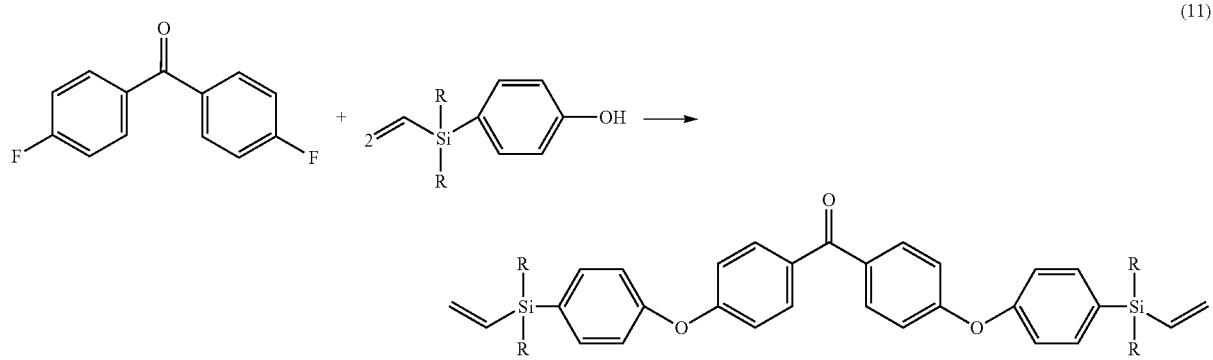

The reaction yields may be 91-95%. The vinyl-terminated oligomers of Eq. (3) may be readily soluble in common organic solvents such as toluene, DMF, acetone, methylene chloride, ether, and chloroform. The structure may be confirmed by IR and $^1$H-NMR spectroscopy. The length of the spacer between the terminal divinyl groups can be varied by changing the ratio between the diol and the benzophenone. The oligomeric divinyl resins may be clear liquids, which may enhance their importance for coating applications.

The carborane-containing compound and any of the aromatic compounds are reacted with one or more crosslinkers having at least two silyl hydrogen atoms. This reaction is described in, for example, U.S. Pat. Nos. 5,969,072; 5,981,678; 6,225,247; 7,153,921; and 7,238,766. Suitable crosslinkers include, but are not limited to, tetrakis(dimeth-

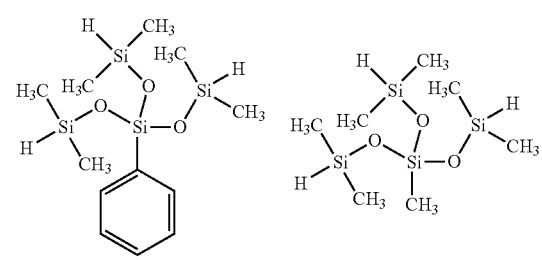

-continued

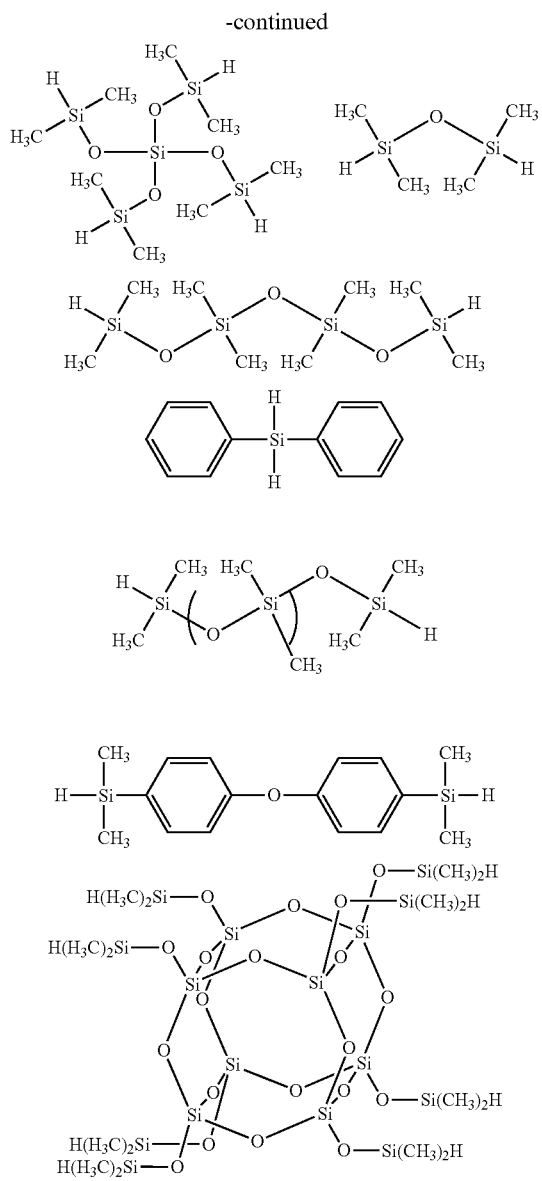

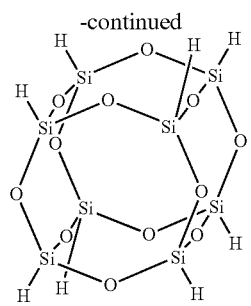

The reaction may be performed in the presence of a hydrosilation catalyst. This can form bonds between the unsaturated U groups in the carborane-siloxane precursor and the terminal silicon atoms in the siloxane crosslinker. The curing of the carboranylenesiloxane precursors using branched or unbranched siloxane crosslinkers can be performed under ambient conditions in either an oxidizing or an inert atmosphere using an appropriate catalyst. The reaction may occur by homogenous hydrosilation, non-aqueous heterogeneous hydrosilation, aqueous heterogeneous hydrosilation, or photochemical hydrosilation. Proper selection of the catalyst may be based upon its efficacy in a particular reaction condition that produces rapid curing. Suitable hydrosilation catalysts include, but are not limited to, Karstedt catalyst, Speier's catalyst, chloroplatinic acid, $Pt(COD)_2$, $Pt(PPh_3)_4$, $PtCl_2(PPh_3)_2$, $[Rh(COD)Cl]_2$, $PtCl_2(PhCN)_2$, $PtCl_2(diop)$, $PtCl_2(dppb)$, $RhCl(PPh_3)_3$, $Cp^*Rh(C_2H_4)(SiR_3)H$, $RhCl_3.3H_2O$, $Rh(PPh_3)_3Cl$, $[Cp^*Rh]_2Cl_4$, $[Cp^*Rh_2]Cl_3H$, $\{[Cp^*Rh]_2(OH)_3\}^+$, $Me_2SiCp^*_2Th(n-Bu)_2$, $Pt(acac)_2$, and $Fe(CO)_5$. More than one catalyst can also be used. Reacting the oligomer with the crosslinker may also occur in the presence of carbon nanotubes, a clay, carbon nanofibers, a metal oxide, or microballoons. Microballoons are micron sized hollow glass beads.

The crosslinker reacts with the vinyl or unsaturated groups as shown in Eq. (12). When benzophenone compounds are present, the ketone and vinyl groups may react as shown in Eq. (13). The ketone group may be more reactive. A thermoset formed from reaction of both the ketone and the vinyl units with the silane groups would be highly crosslinked. Two example structures of products described in Examples 15 and 24 are shown in Eqs. (14) and (15). The ten pentavalent vertices of the polyhedra are boron atoms, and the two hexavalent vertices are carbon atoms.

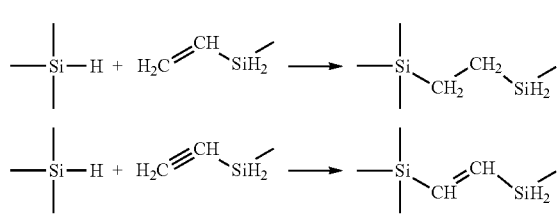

(12)

(13)

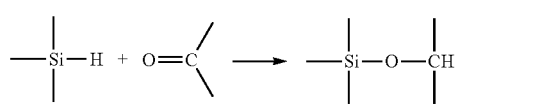

-continued

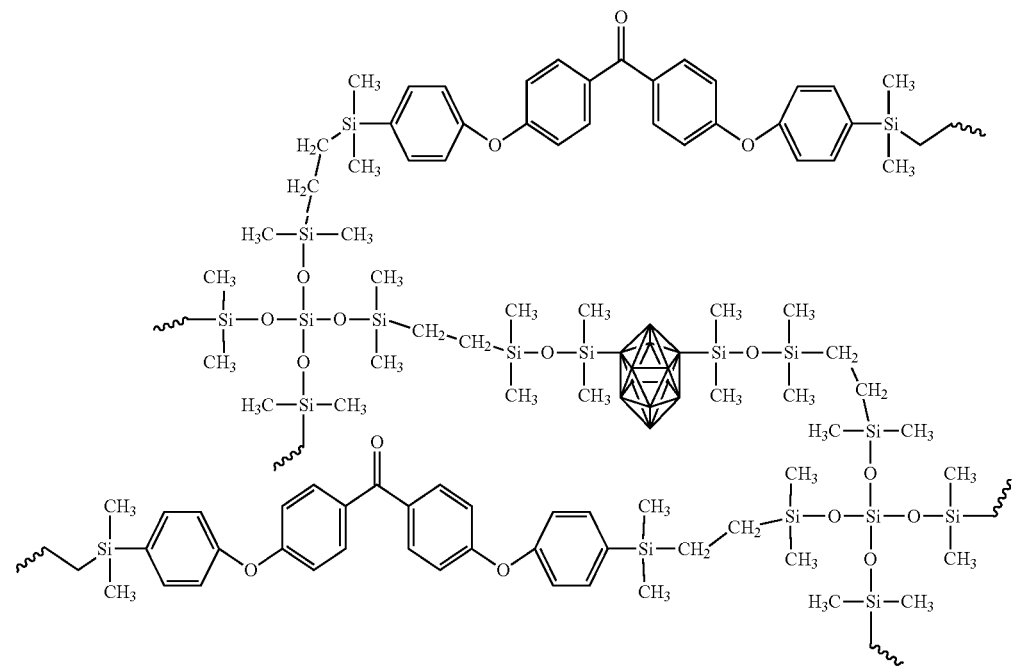
(14)

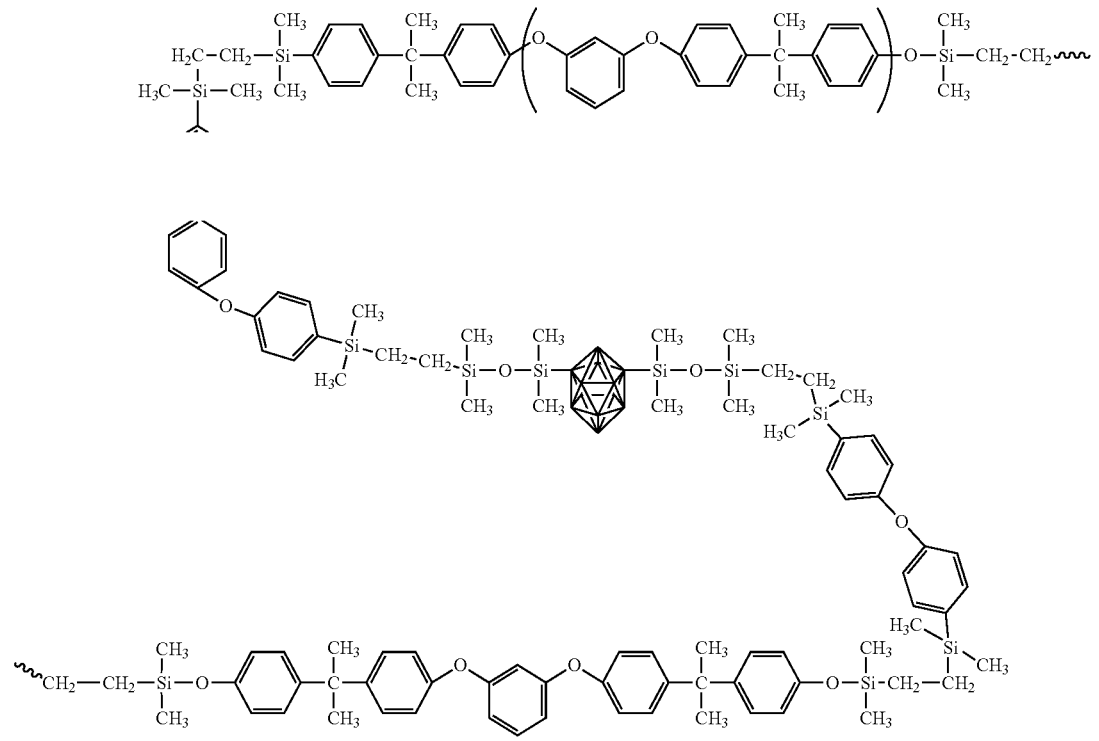
(15)

The resin mixture can also be injected into a fiber-reinforced preform for the fabrication of complex shaped composite components for applications under extreme thermal and oxidative conditions. Various fillers can also be incorporated into the resin mixture of 1 and 2 and cured to shaped structural components. Regardless of whether the cured polymer is an elastomer or a plastic, clear, shaped films or solids, which enhance their importance for optical, electronic, electrical, and structural applications, may be formed. By controlling the reactivity of the catalyst in the curing reaction, the viscosity of the polymerization system can be easily controlled for extended periods yielding a broad processing window, which is advantageous for the fabrication of complex composite components and device coatings. Due to the thermal and oxidative stability of thermoset or network copolymers cured to temperatures in excess of 350° C., the materials have potential for a variety of applications including the fabrication of advanced composite components (ship, aerospace, and marine) by conventional prepreg consolidation, resin transfer molding (RTM), injection molding, and filament winding, as coatings for electronic devices, and as electrical insulator for high voltage cables and aircraft towline applications.

Figure 3:
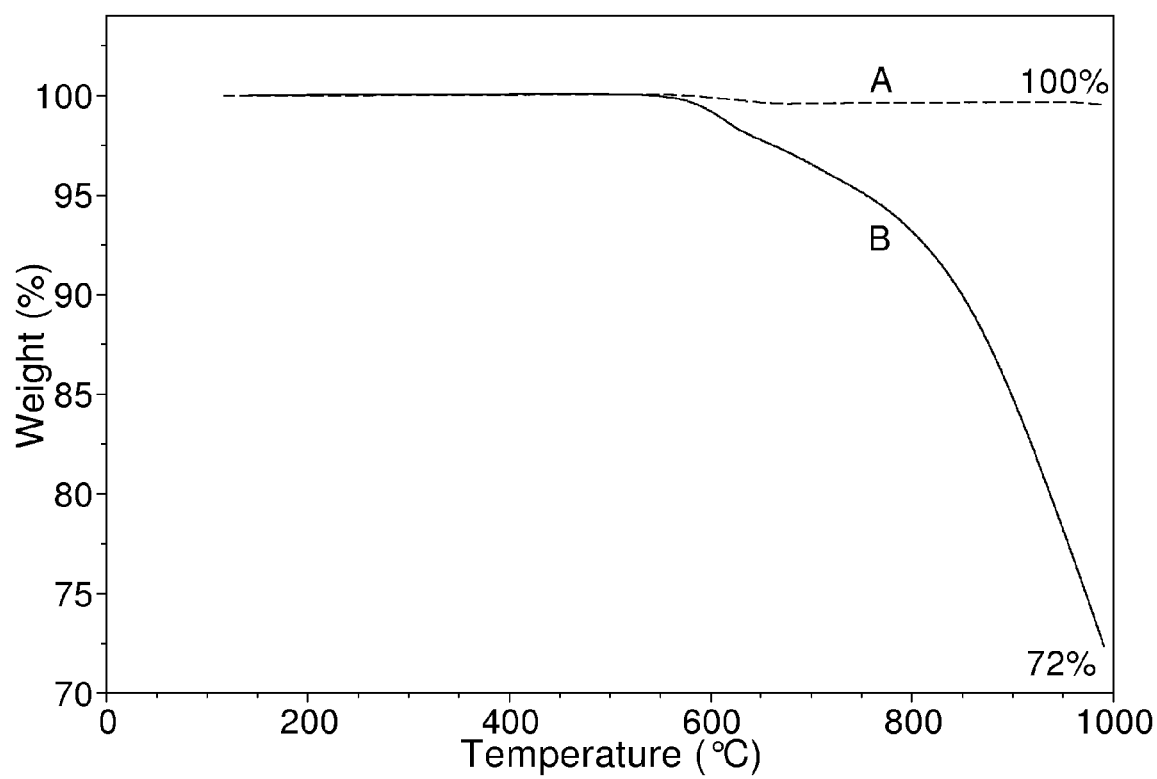
FIG. 3 shows TGA under air of the chars of (A) copolymer containing 10% carborane monomer 2 and (B) neat benzophenone-containing divinyl terminated resin 1.

The ceramics made from these copolymers may have use temperatures in an oxidizing environment approaching 1500° C. and have potential use as insulators on space re-entry vehicles and aircraft engines. FIG. 3 shows the thermo-oxidative stability of ceramic-carbonaceous (A) and carbonaceous (B) chars heated to 1000° C. under inert conditions, cooled, and reheated back to 1000° C. under a flow of air. A ceramic-carbonaceous sample containing 10% of 2 and 80% of 1 in the original precursor mixture showed complete protection of the solid against oxidation. These observations enhance the importance of the copolymers and ceramic-carbonaceous solids for applications under extreme environmental conditions.

The following examples are given to illustrate specific applications. These specific examples are not intended to limit the scope of the disclosure in this application.

Example 1

Synthesis of 2:1 hydroxy terminated oligomer based on bisphenol-A and 4,4'-difluorobenzophenone—To a 250 mL three-necked flask fitted with a thermometer, Dean-Stark trap with condenser, and nitrogen inlet were added bisphenol A (20.0 g, 87.6 mmol), 4,4'-difluorobenzophenone (9.56 g, 43.8 mmol), powdered $K_2CO_3$ (24.2 g, 175 mmol) and N,N-dimethylformamide (100 mL). After filling the Dean-Stark trap with toluene and adding 5 mL to the reaction flask, the mixture was heated to reflux at 145° C. The water formed in the reaction was removed by azeotropic distillation. The mixture was refluxed for 9-12 h until no more water was observed being collected in the Dean-Stark trap. The remaining toluene was then removed by distillation and the reaction mixture cooled to ambient temperature. The reaction mixture was poured into 300 mL of a 10% NaOH solution. The aqueous solution was extracted with ether (2×100 mL) to remove impurities and the water layer was made acidic by the addition of 100 mL of 2 M HCl solution. The resulting mixture was extracted again with ether (2×100 mL) and the ether layers were combined. Carbon black (2 g) was added and the ether extract was filtered through a short plug of silica gel to remove any insoluble components. The solvent was removed and the oil was vacuum dried to yield the analytically pure 2:1 hydroxy terminated oligomer (23.9 g, 86%) as a yellow colored solid.

Example 2

Synthesis of 2:1 oligomeric vinyl silane terminated resin based on bisphenol-A and 4,4'-difluorobenzophenone—To a 100 mL three-necked flask fitted with a thermometer, a Dean-Stark trap with condenser, and a nitrogen inlet were added the 2:1 bisphenol A/benzophenone based hydroxyl terminated aromatic ether oligomer from Example 1 (10.0 g, 15.7 mmol), triethylamine (4.72 ml, 33.9 mmol) and anhydrous tetrahydrofuran (100 mL). The reaction mixture was cooled by means of an ice bath and vinyl(dimethylchloro)silane (4.68 ml, 33.1 mmol) added dropwise. The resulting mixture was stirred for 1 h. The mixture was poured into water, extracted with diethyl ether, and dried over anhydrous sodium sulfate. The solvent was removed in vacuo and the resulting oil was dissolved in 1:1 methylene chloride:hexane and filtered through a silica plug. The solvent was removed in vacuo and the clear oil was vacuum dried to yield the 2:1 oligomeric vinyl silane terminated resin (11.5 g, 91%). IR [cm$^{-1}$]: δ 3052 (C=CH), 2967 ($CH_3$), 1654 (C=O), 1593 (C=C), 1500 (aromatic), 1242 (C—O), 1171 (C—O), 834 (aromatic).

Example 3

Catalytic hydrosilylation reaction of mixture based on 2:1 oligomeric vinyl silane terminated resin prepared from bisphenol-A and 4,4'-difluorobenzophenone and combined with 10% 1,7-bis(vinyltetramethyldisiloxyl)-m-carborane) (2:1 ratio, slow cure) cured with tetrakis(dimethylsiloxy)silane—A mixture formulated from the 2:1 oligomeric vinyl silane terminated resin (0.40 g, 0.49 mmol) of Example 2 was combined with 1,7-bis(vinyltetramethyldisiloxyl)-m-carborane) (0.04 g, 0.087 mmol) and tetrakis(dimethylsiloxy)silane (0.08 mL) and dissolved in 1 mL of dry toluene. With stiffing, a slow cure catalyst (10 μL of 2.0-2.5% platinum-cyclovinylmethylsiloxane complex in xylene solution) was added. The mixture was transferred to a silicone mold and was allowed to gel at room temperature (5 min). The sample was post cured above 100° C. to completely cure the resin. The result was a transparent plastic material, which had good thermal and oxidative stability and retained >75% weight after heating under air to 1000° C. The char produced from this composition was completely air stable up to 1500° C.

Example 4

Catalytic hydrosilylation reaction of mixture based on 2:1 oligomeric vinyl silane terminated resin prepared from bisphenol-A and 4,4'-difluorobenzophenone and combined with 50% 1,7-bis(vinyltetramethyldisiloxyl)-m-carborane) (2:1 ratio, slow cure) cured with tetrakis(dimethylsiloxy)silane—A mixture formulated from the 2:1 oligomeric vinyl silane terminated resin (0.40 g, 0.49 mmol) of Example 2 was combined with 1,7-bis(vinyltetramethyldisiloxyl)-m-carborane) (0.20 g, 0.43 mmol) and tetrakis(dimethylsiloxy)silane (0.11 mL) and dissolved in 1 mL of dry toluene. With stirring, a slow cure catalyst (20 μL of 2.0-2.5% platinum-cyclovinylmethylsiloxane complex in xylene solution) was added. The mixture was transferred to a silicone mold and was allowed to gel at room temperature (5 min). The sample was post cured above 100° C. to completely cure the resin. The result was a transparent plastic material, which had good thermal and oxidative stability and retained >80% weight after heating under air to 1000° C. The char produced from this composition was completely air stable up to 1500° C.

Example 5

Catalytic hydrosilylation reaction of mixture based on 2:1 oligomeric vinyl silane terminated resin prepared from bisphenol-A and 4,4'-difluorobenzophenone and combined with 80% 1,7-bis(vinyltetramethyldisiloxyl)-m-carborane) (2:1 ratio, slow cure) cured with tetrakis(dimethylsiloxy)silane—A mixture formulated from the 2:1 oligomeric vinyl silane terminated resin (0.40 g, 0.49 mmol) of Example 2 was combined with 1,7-bis(vinyltetramethyldisiloxyl)-m-carborane) (0.32 g, 0.69 mmol) and tetrakis(dimethylsiloxy)silane (0.13 mL) and dissolved in 1 mL of dry toluene. With stirring, a slow cure catalyst (15 µL of 2.0-2.5% platinum-cyclovinyl-methylsiloxane complex in xylene solution) was added. The mixture was transferred to a silicone mold and was allowed to gel at room temperature (5 min). The sample was post cured above 100° C. to completely cure the resin. The result was a transparent plastic material, which had good thermal and oxidative stability and retained >83% weight after heating under air to 1000° C. The char produced from this composition was completely air stable up to 1500° C.

Example 6

Catalytic hydrosilylation reaction of mixture based on 2:1 oligomeric vinyl silane terminated resin prepared from bisphenol-A and 4,4'-difluorobenzophenone and combined with 10% 1,7-bis(vinyltetramethyldisiloxyl)-m-carborane) (2.5:1 ratio, rapid cure) cured with bis[(p-dimethylsilyl)phenyl]ether—A mixture formulated from the 2:1 oligomeric vinyl silane terminated resin (0.30 g, 0.37 mmol) of Example 2 was combined with 1,7-bis(vinyltetramethyldisiloxyl)-m-carborane) (0.03 g, 0.065 mmol) and bis[(p-dimethylsilyl)phenyl]ether (0.06 g) and dissolved in 1 mL of dry toluene. With stirring, a rapid cure catalyst (10 µL of 2.0-2.5% platinum-vinylmethylsiloxane complex in xylene solution) was added. The mixture was transferred to a silicone mold and was allowed to gel at room temperature (15 min). The sample was post cured above 100° C. to completely cure the resin. The result was a transparent elastomeric material, which had good thermal and oxidative stability and retained >75% weight after heating under air to 1000° C. The char produced from this composition was completely air stable up to 1500° C.

Example 7

Catalytic hydrosilylation reaction of mixture based on 2:1 oligomeric vinyl silane terminated resin prepared from bisphenol-A and 4,4'-difluorobenzophenone and combined with 10% 1,7-bis(vinyltetramethyldisiloxyl)-m-carborane) (1:1 ratio, rapid cure) cured with and tetrakis(dimethylsiloxy) silane—A mixture formulated from the 2:1 oligomeric vinyl silane terminated resin (0.45 g, 0.56 mmol) of Example 2 was combined with 1,7-bis(vinyltetramethyldisiloxyl)-m-carborane) (0.05 g, 0.11 mmol) and diphenylsilane (0.11 g) and dissolved in 1 mL of dry toluene. With stirring, a rapid cure catalyst (12 µL of 2.0-2.5% platinum-vinylmethylsiloxane complex in xylene solution) was added. The mixture was transferred to a silicone mold and was allowed to gel at room temperature (5 min). The sample was post cured above 100° C. to completely cure the resin. The result was a transparent plastic material, which had good thermal and oxidative stability and retained >70% weight after heating under air to 1000° C. The char produced from this composition was completely air stable up to 1500° C.

Example 8

Catalytic hydrosilylation reaction of mixture based on 2:1 oligomeric vinyl silane terminated resin prepared from bisphenol-A and 4,4'-difluorobenzophenone and combined with 10% 1,7-bis(vinyltetramethyldisiloxyl)-m-carborane) (1:1 ratio, rapid cure) cured with 1,1,3,3,5,5,7,7-octamethyltetrasiloxane—A mixture formulated from the 2:1 oligomeric vinyl silane terminated resin (0.60 g) of Example 2 was combined with 1,7-bis(vinyltetramethyldisiloxyl)-m-carbo-

16 rane) (0.06 g, 0.13 mmol) and 1,1,3,3,5,5,7,7-octamethyltetrasiloxane (0.23 g) and dissolved in 1 mL of dry toluene. With stiffing, a rapid cure catalyst (30 µL of 2.0-2.5% platinum-vinylmethylsiloxane complex in xylene solution) was added. The mixture was transferred to a silicone mold and was allowed to gel at room temperature (5 min). The sample was post cured above 100° C. to completely cure the resin. The result was a transparent elastomeric material, which had good thermal and oxidative stability and retained >70% weight after heating under air to 1000° C. The char produced from this composition was completely air stable up to 1500° C.

Example 9

Synthesis of 2:1 hydroxy terminated oligomer based on bisphenol-A6F and 4,4'-difluorobenzophenone—To a 250 mL three-necked flask fitted with a thermometer, Dean-Stark trap with condenser, and nitrogen inlet were added bisphenol-A6F (10.0 g, 29.7 mmol), 4,4'-difluorobenzophenone (3.24 g, 15.1 mmol), powdered $K_2CO_3$ (8.20 g, 59.4 mmol) and N,N-dimethylformamide (50 mL). After filling the Dean-Stark trap with toluene and adding 5 mL to the reaction flask, the mixture was heated to reflux at 145° C. The water formed in the reaction was removed by azeotropic distillation. The mixture was refluxed for 9-12 h until no more water was observed being collected in the Dean-Stark trap. The remaining toluene was then removed by distillation and the reaction mixture was cooled to ambient temperature. Water was added (300 mL) to the reaction mixture. At this point, the mixture was slightly basic and 2 M HCl (200 mL) was added. The mixture was then extracted with ether (2×50 mL) and the combined ether layers were washed with 2 M HCl (1×100 mL) and water (1×100 mL). The hydroxy terminated oligomeric intermediate was extracted into the water layer by addition of 200 mL of 10% NaOH solution. The aqueous solution was extracted with ether (2×100 mL) to remove impurities and the water layer was made acidic by the addition of 100 mL of 2 M HCl solution. The resulting mixture was extracted again with ether (2×100 mL) and the ether layers were combined. Carbon black (2 g) was added and the ether extract was filtered through a short plug of silica gel to remove any insoluble components. The solvent was removed and the oil was vacuum dried to yield the analytically pure 2:1 hydroxy terminated oligomer (12.2 g, 96%) as a white solid.

Example 10

Synthesis of 2:1 oligomeric vinyl silane terminated resin based on bisphenol-A6F and 4,4'-difluorobenzophenone—To a 100 mL three-necked flask fitted with a thermometer, a Dean-Stark trap with condenser, and a nitrogen inlet were added the 2:1 bisphenol-A6F/benzophenone based hydroxyl terminated aromatic ether oligomer from Example 9 (10.0 g, 11.8 mmol), triethylamine (3.52 ml, 25.2 mmol) and anhydrous tetrahydrofuran (100 mL). The reaction mixture was cooled by means of an ice bath and vinyl (dimethylchloro) silane (3.50 ml, 24.7 mmol) was added dropwise. The resulting mixture was stirred for 1 h. The mixture was then poured into water, extracted with diethyl ether, and dried over anhydrous sodium sulfate. The solvent was removed in vacuo and the resulting oil was dissolved in 1:1 methylene chloride: hexane and filtered through a silica plug. The solvent was removed in vacuo and the clear oil was vacuum dried to yield the 2:1 oligomeric vinyl silane terminated resin (11.0 g, 92%). IR $[cm^{-1}]$: δ 3051 (C=CH), 2968 ($CH_3$), 1654 (C=O), 1590 (C=C), 1501 (aromatic), 1242 (C—O), 1171 (C—O), 833 (aromatic).

Example 11

Catalytic hydrosilylation reaction of mixture based on 2:1 oligomeric vinyl silane terminated resin produced from bisphenol-A6F and 4,4'-difluorobenzophenone and combined with 20% 1,7-bis(vinyltetramethyldisiloxyl)-m-carborane) (3:1 ratio, rapid cure) cured with tetrakis(dimethylsiloxy)silane—A mixture formulated from the 2:1 oligomeric vinyl silane terminated resin (0.40 g, 0.39 mmol) of Example 10 was combined with 1,7-bis(vinyltetramethyldisiloxyl)-m-carborane) (0.08 g, 0.17 mmol) and tetrakis(dimethylsiloxy)silane (0.06 mL) and dissolved in 1 mL of dry toluene. While stiffing, a rapid cure catalyst (10 µL of 2.0-2.5% platinum-vinylmethylsiloxane complex in xylene solution) was added. The mixture was transferred to a silicone mold and was allowed to gel at room temperature (60 seconds). The sample was post cured above 100° C. to completely cure the resin. The result was a transparent plastic material, which had good thermal and oxidative stability and retained >75% weight after heating under air to 1000° C. The char produced from this composition was completely air stable up to 1500° C.

Example 12

Catalytic hydrosilylation reaction of mixture based on 2:1 oligomeric vinyl silane terminated resin prepared from bisphenol-A6F and 4,4'-difluorobenzophenone and combined with 30% 1,7-bis(vinyltetramethyldisiloxyl)-m-carborane) (1:1 ratio, rapid cure) cured with phenyl tris(dimethylsiloxy)silane—A mixture formulated from the 2:1 oligomeric vinyl silane terminated resin (0.20 g, 0.20 mmol) of Example 10 was combined with 1,7-bis(vinyltetramethyldisiloxyl)-m-carborane) (0.06 g, 0.13 mmol) phenyl tri(dimethylsiloxy)silane (0.11 mL) and dissolved in 1 mL of dry toluene. While stiffing, a rapid cure catalyst (10 µL of 2.0-2.5% platinum-vinylmethylsiloxane complex in xylene solution) was added. The mixture was transferred to a silicone mold and was allowed to gel at room temperature (10 seconds). The sample was post cured above 100° C. to completely cure the resin. The result was a transparent elastomeric sample, which had good thermal and oxidative stability and retained >80% weight after heating under air to 1000° C. The char produced from this composition was completely air stable up to 1500° C.

Example 13

Synthesis of 2:1 hydroxy terminated oligomer based on resorcinol and 4,4'-difluorobenzophenone—To a 250 mL three-necked flask fitted with a thermometer, Dean-Stark trap with condenser, and nitrogen inlet were added resorcinol (10.0 g, 90.1 mmol), 4,4'-difluorobenzophenone (9.90 g, 45.4 mmol), powdered $K_2CO_3$ (31.4 g, 227 mmol) and N,N-dimethylformamide (100 mL). After filling the Dean-Stark trap with toluene and adding 5 mL to the reaction flask, the mixture was heated to reflux at 145° C. The water formed in the reaction was removed by azeotropic distillation. The mixture was refluxed for 9-12 h until no more water was observed being collected in the Dean-Stark trap. The remaining toluene was then removed by distillation and the reaction mixture was cooled to ambient temperature. The reaction mixture was poured into 300 mL of a 10% NaOH solution. The aqueous solution was extracted with ether (2×100 mL) to remove impurities and the water layer was made acidic by the addition of 100 mL of 2 M HCl solution. The resulting mixture was extracted again with ether (2×100 mL) and the ether layers were combined. Carbon black (2 g) was added and the ether extract was filtered through a short plug of silica gel to remove any insoluble components. The solvent was removed and the oil was vacuum dried to yield the analytically pure 2:1 hydroxy terminated oligomer (14.6 g, 90%) as a yellow solid.

Example 14

Synthesis of 2:1 oligomeric vinyl silane terminated resin based on resorcinol and 4,4'-difluorobenzophenone—To a 100 mL three-necked flask fitted with a thermometer, a Dean-Stark trap with condenser, and a nitrogen inlet were added the 2:1 resorcinol/benzophenone based hydroxyl terminated aromatic ether oligomer from Example 13 (10.0 g, 25.1 mmol), triethylamine (7.52 ml, 54.0 mmol) and anhydrous tetrahydrofuran (200 mL). The reaction mixture was cooled by means of an ice bath and vinyl(dimethylchloro)silane (7.46 ml, 52.7 mmol) was added dropwise. The resulting mixture was stirred for 1 h. The mixture was poured into water and extracted with diethyl ether. The solvent was removed in vacuo and the resulting oil was dissolved in 1:1 methylene chloride:hexane and filtered through a silica plug. The solvent was removed in vacuo and the clear oil was vacuum dried to yield the 2:1 oligomeric vinyl silane terminated resin (13.4 g, 94%). IR [cm$^{-1}$]: δ 3052 (C═CH), 2970 (CH$_3$), 1655 (C═O), 1593 (C═C), 1503 (aromatic), 1241 (C—O), 1170 (C—O), 834 (aromatic).

Example 15

Catalytic hydrosilylation reaction of mixture based on 2:1 oligomeric vinyl silane terminated resin prepared from resorcinol and 4,4'-difluorobenzophenone and combined with 10% 1,7-bis(vinyltetramethyldisiloxyl)-m-carborane) (2.5:1 ratio, rapid cure) cured with tetrakis(dimethylsiloxy)silane—A mixture formulated from the 2:1 oligomeric vinyl silane terminated resin (0.41 g) of Example 14 was combined with 1,7-bis(vinyltetramethyldisiloxyl)-m-carborane) (0.06 g, 0.072 mmol) and tetrakis(dimethylsiloxy)silane (0.15 mL) and dissolved in 2 mL of dry toluene. While stiffing, a rapid cure catalyst (20 µL, of 2.0-2.5% platinum-vinylmethylsiloxane complex in xylene solution) was added. The mixture was transferred to a silicone mold and was allowed to gel at room temperature (30 seconds). The sample was post cured above 100° C. to completely cure the resin. The result was a transparent plastic material, which had good thermal and oxidative stability and retained >70% weight after heating under air to 1000° C. The char produced from this composition was completely air stable up to 1500° C.

Example 16

Formulation of microballoon compositions from a catalytic hydrosilylation reaction of 2:1 oligomeric vinyl silane terminated resin based on bisphenol-A and 4,4'-difluorobenzophenone and tetrakis(dimethylsiloxy)silane with 10% 1,7-bis(vinyltetramethyldisiloxyl)-m-carborane) (2:1 ratio, rapid cure)—A mixture formulated from the 2:1 oligomeric vinyl silane terminated resin (0.50 g) of Example 14 was combined with 1,7-bis(vinyltetramethyldisiloxyl)-m-carborane) (0.05 g, 0.062 mmol) and tetrakis(dimethylsiloxy)silane (0.10 mL) and dissolved in 1 mL of dry toluene and various amount of microballoons (0.01 to 20 weight %) were added with stiffing. With continued stiffing, a rapid cure catalyst (70 µL of 2.0-2.5% platinum-vinylmethylsiloxane complex in xylene solution) was added. The mixture was transferred to a silicone mold and was allowed to gel at room temperature (5 seconds). The sample was post cured above 100° C. to completely cure

Example 17

Synthesis of 2:1 oligomeric vinyl silane terminated resin based on 4,4'-difluorobenzophenone (excess) and bisphenol-A—To a 100 mL three-necked flask fitted with a thermometer, a Dean-Stark trap with condenser, and a nitrogen inlet were added the oligomeric product from the reaction of 2 moles of 4,4'-difluorobenzophenone and 1 mole of bisphenol A (3.44 g, 5.50 mmol), 4-vinyl(dimethylsilyl)phenol (2.06 g, 11.6 mmol) and potassium carbonate (5.00 g, 36.2 mmol) in 10 mL of DMF. The mixture was heated to 145° C. for 3 h. The mixture was cooled, poured into water, and extracted with diethyl ether. The solvent was removed in vacuo and the resulting oil was dissolved in 1:1 methylene chloride:hexane and filtered through a silica plug. The solvent was removed in vacuo and the clear oil was vacuum dried to yield the 2:1 oligomeric vinyl silane terminated resin (4.16 g, 80%). IR [cm$^{-1}$]: δ 3050 (C=CH), 2967 (CH$_3$), 1655 (C=O), 1593 (C=C), 1498 (aromatic), 1242 (C—O), 1171 (C—O), 834 (aromatic).

Example 18

Catalytic hydrosilylation reaction of mixture based on 2:1 oligomeric vinyl silane terminated resin prepared from 4,4'-difluorobenzophenone (excess), bisphenol-A and 4-vinyl) dimethylsilyl)phenol and combined with 10% 1,7-bis(vinyltetramethyldisiloxyl)-m-carborane) (2:1 ratio, slow cure) cured with tetrakis(dimethylsiloxy)silane—A mixture of vinyl terminated oligomeric monomer (0.35 g, 0.37 mmol) from Example 17 was combined with 1,7-bis(vinyltetramethyldisiloxyl)-m-carborane) (0.04 g, 0.074 mmol) and tetrakis (dimethylsiloxy)silane (0.08 mL) and was dissolved in 1 mL of dry toluene. While stiffing, a slow cure catalyst (35 μL of 2.0-2.5% platinum-cyclovinylmethylsiloxane complex in xylene solution) was added. The mixture was transferred to a silicone mold and was allowed to gel at room temperature (15 min). The sample was post cured above 100° C. to completely cure the resin. The result was a transparent plastic material, which had good thermal and oxidative stability and retained >70% weight after heating under air to 1000° C. The char produced from this composition was completely air stable up to 1500° C.

Example 19

Synthesis of 2:1 vinyl silane terminated resin based on 4,4'-difluorobenzophenone—To a 100 mL three-necked flask fitted with a thermometer, a Dean-Stark trap with condenser, and a nitrogen inlet were added the 4,4'-difluorobenzophenone (0.85 g, 3.90 mmol), 4-vinyl(dimethylsilyl)phenol (1.43 g, 8.00 mmol) and potassium carbonate (3.32 g, 24.0 mmol) in 5 mL of N,N-dimethylformamide. After filling the Dean-Stark trap with toluene and adding 5 mL to the reaction flask, the mixture was heated to 130° C. for 16 h to remove the water by-product by azeotropic distillation. At this time, the toluene was removed by distillation at reduced pressure and the reaction mixture was cooled, poured into water, and extracted with diethyl ether. The solvent was removed in vacuo and the resulting oil, dissolved in 1:1 methylene chloride:hexane, was filtered through a silica plug. The solvent was removed in vacuo and the clear oil was vacuum dried to yield the 2:1 oligomeric vinyl silane terminated resin (1.29 g, 61%). IR [cm$^{-1}$]: δ 3050 (C=CH), 2967 (CH$_3$), 1655 (C=O), 1593 (C=C), 1498 (aromatic), 1242 (C—O), 1171 (C—O), 834 (aromatic).

Example 20

Catalytic hydrosilylation reaction from reaction of vinyl silane terminated resin based on 4,4'-difluorobenzophenone and 4-vinyl(dimethylsilyl)phenol and combined with 20% 1,7-bis(vinyltetramethyldisiloxyl)-m-carborane) (2:1 ratio, rapid cure) cured with tetrakis(dimethylsiloxy)silane—A mixture of vinyl silane terminated resin (0.20 g, 0.37 mmol) of Example 19 was combined with 1,7-bis(vinyltetramethyldisiloxyl)-m-carborane) (0.04 g, 0.07 mmol) and tetrakis (dimethylsiloxy)silane (0.08 mL) and dissolved in 2 mL of dry toluene. While stirring, a rapid cure catalyst (30 μL of 2.0-2.5% platinum-vinylmethylsiloxane complex in xylene solution) was added. The mixture was transferred to a silicone mold and was allowed to gel at room temperature (15 sec). The sample was post cured above 100° C. to completely cure the resin. The result was a transparent plastic material, which had good thermal and oxidative stability and retained >72% weight after heating under air to 1000° C. The char produced from this composition was completely air stable up to 1500° C.

Example 21

Synthesis of 2:1 hydroxy terminated oligomer based on bisphenol A and 1,3-dibromobenzene—To a 100 mL three-necked flask fitted with a thermometer, a Dean-Stark trap with condenser, and nitrogen inlet were added bisphenol A (10.0 g, 43.8 mmol), 1,3-dibromobenzene (2.64 mL, 5.16 g, 21.9 mmol), 1,10-phenanthroline (350 mg, 1.94 mmol) and N,N-dimethylformamide (50 mL). The resulting mixture was degassed with nitrogen for 10 min., followed by the addition of copper (I) bromide (420 mg, 2.94 mmol) and Cs$_2$CO$_3$ (7.80 g, 23.9 mmol). After filling the Dean-Stark trap with toluene and adding 5 mL to the reaction flask, the mixture was heated to reflux at 145° C. for 1 hr. The water formed in the reaction was removed by azeotropic distillation and at this time, an additional portion of K$_2$CO$_3$ (15.1 g, 111 mmol) was added. The mixture was refluxed for 9-12 hr until no more water was observed being collected in the Dean-Stark trap. The remaining toluene was then removed by distillation and the reaction mixture was cooled to ambient temperature. Water was added (500 mL) to the reaction mixture. At this point, the mixture was slightly basic and 2 M HCl (300 mL) was added. The mixture was then extracted with ether (2×100 mL) and the combined ether layers were washed with 2 M HCl (1×100 mL) and water (1×100 mL). The hydroxy terminated oligomeric intermediate was dissolved into the water layer by the addition of 200 mL of 10% NaOH solution. The mixture was then extracted with ether (2×100 mL) to remove impurities and the water layer was made acidic by the addition of 100 mL of 2 M HCl solution. The aqueous solution was again extracted with ether (2×100 mL) and the ether layers were combined. Carbon black (2 g) was added and the ether extract was filtered through a short plug of silica gel to remove any insoluble components. The solvent was removed and the oil was vacuum dried to yield the analytically pure 2:1 hydroxy terminated oligomer (10.3 g, 92%) as an amber colored solid.

Example 22

Synthesis of 2:1 oligomeric vinyl silane terminated resin based on bisphenol-A and 1,3-dibromobenzene—To a 100 mL three-necked flask fitted with a thermometer, a condenser, and a nitrogen inlet were added the 2:1 bisphenol A/1,3-dibromobenzene based hydroxyl terminated aromatic ether oligomer (2.00 g, 3.77 mmol) of Example 21, triethylamine (1.16 ml, 8.32 mmol) and anhydrous tetrahydrofuran (25 mL). The reaction mixture was cooled by means of an ice bath and vinyl(dimethylchloro)silane (1.09 mL, 7.70 mmol) was added dropwise. The resulting mixture was stirred for 1 h. The mixture was poured into water, extracted with diethyl ether, and dried under anhydrous sodium sulfate. The solvent was removed in vacuo and the resulting oil was dissolved in 1:1 methylene chloride:hexane and filtered through a silica plug. The solvent was removed in vacuo and the clear oil was vacuum dried to yield the 2:1 oligomeric vinyl silane terminated resin (2.47 g, 98%). IR [cm$^{-1}$]: δ 3052 (C=CH), 2967 (CH$_3$), 1593 (C=C), 1500 (aromatic), 1242 (C—O), 1171 (C—O), 834 (aromatic).

Example 23

Catalytic hydrosilylation reaction of mixture based on 2:1 oligomeric vinyl silane terminated resin prepared from bisphenol-A and 1,3-dibromobenzene and combined with 20% 1,7-bis(vinyltetramethyldisiloxyl)-m-carborane) (2:1 ratio, slow cure) cured with tetrakis(dimethylsiloxy)silane—A mixture formulated from the 2:1 oligomeric vinyl silane terminated resin (0.40 g, 0.57 mmol) of Example 22 was combined with 1,7-bis(vinyltetramethyldisiloxyl)-m-carborane) (0.08 g, 0.11 mmol) and tetrakis(dimethylsiloxy) silane (0.10 mL) and dissolved in 1 mL of dry toluene. While stiffing, 20 μL of 2.0-2.5% platinum-vinylmethylsiloxane complex in xylene solution was added. The mixture was transferred to a silicone mold and was allowed to gel at room temperature (12 h). The sample was post cured above 100° C. to completely cure the resin. The result was a transparent plastic material, which had good thermal and oxidative stability and retained >75% weight after heating under air to 1000° C. The char produced from this composition was completely air stable up to 1500° C.

Example 24

Catalytic hydrosilylation reaction of mixture based on 2:1 oligomeric vinyl silane terminated resin prepared from bisphenol-A and 1,3-dibromobenzene and combined with 10% 1,7-bis(vinyltetramethyldisiloxyl)-m-carborane) (2.5:1 ratio, slow cure) cured with bis[(p-dimethylsilyl)phenyl] ether—A mixture formulated from the 2:1 oligomeric vinyl silane terminated resin (0.30 g, 0.42 mmol) of Example 22 was combined with 1,7-bis(vinyltetramethyldisiloxyl)-m-carborane) (0.03 g, 0.042 mmol) and bis[(p-dimethylsilyl) phenyl]ether (0.05 g) and dissolved in 1 mL of dry toluene. While stiffing, 20 μL of 2.0-2.5% platinum-vinylmethylsiloxane complex in xylene solution was added. The mixture was transferred to a silicone mold and was allowed to gel at room temperature (12 h). The sample was post cured above 100° C. to completely cure the resin. The result was a transparent elastomeric material, which had good thermal and oxidative stability and retained >70% weight after heating under air to 1000° C. The char produced from this composition was completely air stable up to 1500° C.

Example 25

Catalytic hydrosilylation reaction of mixture based on 2:1 oligomeric vinyl silane terminated resin prepared from bisphenol-A and 1,3-dibromobenzene and combined with 10% 1,7-bis(vinyltetramethyldisiloxyl)-m-carborane) (1:1 ratio, rapid cure) cured with diphenylsilane—A mixture formulated from the 2:1 oligomeric vinyl silane terminated resin (0.55 g, 0.78 mmol) of Example 22 was combined with 1,7-bis(vinyltetramethyldisiloxyl)-m-carborane) (0.06 g, 0.078 mmol) and diphenylsilane (0.14 g) and dissolved in 1 mL of dry toluene. While stirring, 15 μL of 2.0-2.5% platinum-vinylmethylsiloxane complex in xylene solution was added. The mixture was transferred to a silicone mold and was allowed to gel at room temperature (2 h). The sample was post cured above 100° C. to completely cure the resin. The result was a transparent elastomeric material, which had good thermal and oxidative stability and retained >70% weight after heating under air to 1000° C. The char produced from this composition was completely air stable up to 1500° C.

Example 26

Catalytic hydrosilylation reaction of mixture based on 2:1 oligomeric vinyl silane terminated resin prepared from bisphenol-A and 1,3-dibromobenzene and combined with 10% 1,7-bis(vinyltetramethyldisiloxyl)-m-carborane) (1:1 ratio, rapid cure) cured with 1,1,3,3,5,5,7,7-octamethyltetrasiloxane—A mixture formulated from the 2:1 oligomeric vinyl silane terminated resin (0.40 g, 0.57 mmol) of Example 22 was combined with 1,7-bis(vinyltetramethyldisiloxyl)-m-carborane) (0.04 g, 0.057 mmol) and 1,1,3,3,5,5,7,7-octamethyltetrasiloxane (0.18 g) and dissolved in 1 mL of dry toluene. While stirring, 20 μL of 2.0-2.5% platinum-vinylmethylsiloxane complex in xylene solution was added. The mixture was transferred to a silicone mold and was allowed to gel at room temperature (2 h). The sample was post cured above 100° C. to completely cure the resin. The result was a transparent elastomeric material, which had good thermal and oxidative stability and retained >70% weight after heating under air to 1000° C. The char produced from this composition was completely air stable up to 1500° C.

Example 27

Catalytic hydrosilylation reaction of mixture based on 2:1 oligomeric vinyl silane terminated resin prepared from bisphenol-A and 1,3-dibromobenzene and combined with 10% 1,7-bis(vinyltetramethyldisiloxyl)-m-carborane) (2.5:1 ratio, rapid cure) cured with 1,1,3,3-tetramethyldisiloxane—A mixture formulated from the 2:1 oligomeric vinyl silane terminated resin (0.70 g, 1.00 mmol) of Example 22 was combined with 1,7-bis(vinyltetramethyldisiloxyl)-m-carborane) (0.07 g, 0.100 mmol) and 1,1,3,3-tetramethyldisiloxane (0.14 mL) and dissolved in 1 mL of dry toluene. While stiffing, 20 μL of 2.0-2.5% platinum-vinylmethylsiloxane complex in xylene solution was added. The mixture was transferred to a silicone mold and was allowed to gel at room temperature (12 h). The sample was post cured above 100° C. to completely cure the resin. The result was a transparent elastomeric sample, which had good thermal and oxidative stability and retained >70% weight after heating under air to 1000° C. The char produced from this composition was completely air stable up to 1500° C.

Example 28

Synthesis of 2:1 hydroxy terminated oligomer based on bisphenol-A6F and 1,3-dibromobenzene—To a 100 mL three necked flask fitted with a thermometer, a Dean-Stark trap with condenser, and nitrogen inlet were added bisphenol-A6F (14.7 g, 43.8 mmol), 1,3-dibromobenzene (2.64 mL, 5.16 g, 21.9 mmol), 1,10-phenanthroline (350 mg, 1.94 mmol) and N,N-dimethylformamide (50 mL). The resulting mixture was degassed with nitrogen for 10 min., followed by the addition of copper (I) bromide (420 mg, 2.94 mmol) and $K_2CO_3$ (15.1 g, 111 mmol). After filling the Dean-Stark trap with toluene and adding 5 mL to the reaction flask, the mixture was refluxed for 9-12 hr until no more water was observed being collected in the Dean-Stark trap. The remaining toluene was then removed by distillation and the reaction mixture was cooled to ambient temperature. Water was added (500 mL) to the reaction mixture. At this point, the mixture was slightly basic and 2 M HCl (300 mL) was added. The mixture was then extracted with ether (2×100 mL) and the combined ether layers were washed with 2 M HCl (1×100 mL) and water (1×100 mL). The hydroxy terminated oligomeric intermediate was dissolved into the water layer by addition of 200 mL of 10% NaOH solution. The mixture was then extracted with ether (2×100 mL) to remove impurities and the water layer was made acidic by the addition of 100 mL of 2 M HCl solution. The aqueous solution was again extracted with ether (2×100 mL) and the ether layers were combined. Carbon black (2 g) was added and the ether extract was filtered through a short plug of silica gel to remove any insoluble components. The solvent was removed and the oil was vacuum dried to yield the analytically pure 2:1 hydroxy terminated oligomer (12.5 g, 90%) as an amber colored solid.

Example 29

Synthesis of 2:1 oligomeric vinyl silane terminated resin based on bisphenol-A6F and 1,3-dibromobenzene—To a 100 mL three-necked flask fitted with a thermometer, a condenser, and a nitrogen inlet were added the 2:1 bisphenol-A6F/1,3-dibromobenzene based hydroxyl terminated aromatic ether oligomer (10.0 g, 13.4 mmol) of Example 28, triethylamine (4.01 ml, 28.8 mmol) and anhydrous tetrahydrofuran (100 mL). The reaction mixture was cooled by means of an ice bath and vinyl(dimethylchloro)silane (3.98 ml, 28.1 mmol) was added dropwise. The resulting mixture was stirred for 1 h. The mixture was poured into water, extracted with diethyl ether, and dried over anhydrous sodium sulfate. The solvent was removed in vacuo and the resulting oil dissolved in 1:1 methylene chloride:hexane was filtered through a silica plug. The solvent was removed in vacuo and the clear oil was vacuum dried to yield the 2:1 oligomeric vinyl silane terminated resin (11.5 g, 94%). IR $[cm^{-1}]$: δ 3053 (C=CH), 2969 ($CH_3$), 1588 (C=C), 1500 (aromatic), 1245 (C—O), 1170 (C—O), 834 (aromatic).

Example 30

Catalytic hydrosilylation reaction of mixture based on 2:1 oligomeric vinyl silane terminated resin prepared from bisphenol-A6F and 1,3-dibromobenzene and combined with 15% 1,7-bis(vinyltetramethyldisiloxyl)-m-carborane) (3:1 ratio, slow cure) cured with tetrakis(dimethylsiloxy)silane—A mixture formulated from the 2:1 oligomeric vinyl silane terminated resin (0.40 g, 0.43 mmol) of Example 29 was combined with 1,7-bis(vinyltetramethyldisiloxyl)-m-carborane) (0.06 g, 0.065 mmol) and tetrakis(dimethylsiloxy) silane (0.05 mL) and dissolved in 1 mL of dry toluene. While stirring, 10 µL of 2.0-2.5% platinum-vinylmethylsiloxane complex in xylene solution was added. The mixture was transferred to a silicone mold and was allowed to gel at room temperature (24 h) The sample was post cured above 100° C. to completely cure the resin. The result was a transparent plastic material, which had good thermal and oxidative stability and retained >73% weight after heating under air to 1000° C. The char produced from this composition was completely air stable up to 1500° C.

Example 31

Catalytic hydrosilylation reaction based on 2:1 oligomeric vinyl silane terminated resin prepared from bisphenol-A6F and 1,3-dibromobenzene was combined with 10% 1,7-bis (vinyltetramethyldisiloxyl)-m-carborane) (1:1 ratio, rapid cure) cured with phenyl tris(dimethylsiloxy)silane—A mixture formulated from the 2:1 oligomeric vinyl silane terminated resin (0.20 g, 0.22 mmol) of Example 29 was combined with 1,7-bis(vinyltetramethyldisiloxyl)-m-carborane) (0.02 g, 0.021 mmol) and phenyl tri(dimethylsiloxy)silane (0.10 mL) and dissolved in 1 mL of dry toluene. While stirring, 10 µL of 2.0-2.5% platinum-vinylmethylsiloxane complex in xylene solution was added. The mixture was transferred to a silicone mold and was allowed to gel at room temperature (8 h). The sample was post cured above 100° C. to completely cure the resin. The result was a transparent elastomeric material, which had good thermal and oxidative stability and retained >70% weight after heating under air to 1000° C. The char produced from this composition was completely air stable up to 1500° C.

Example 32

Catalytic hydrosilylation reaction based on 2:1 oligomeric vinyl silane terminated resin prepared from bisphenol-A6F and 1,3-dibromobenzene was combined with 20% 1,7-bis (vinyltetramethyldisiloxyl)-m-carborane) (2:1 ratio, rapid cure) cured with methyl tris(dimethylsiloxy)silane—A mixture formulated from the 2:1 oligomeric vinyl silane terminated resin (0.37 g, 0.40 mmol) of Example 29 was combined with 1,7-bis(vinyltetramethyldisiloxyl)-m-carborane) (0.07 g, 0.080 mmol) and methyl tri(dimethylsiloxy)silane (0.06 mL) and dissolved in 1 mL of dry toluene. While stirring, 20 µL of 2.0-2.5% platinum-vinylmethylsiloxane complex in xylene solution was added. The mixture was transferred to a silicone mold and was allowed to gel at room temperature (6 h). The sample was post cured above 100° C. to completely cure the resin. The result was a transparent elastomeric material, which had good thermal and oxidative stability and retained >75% weight after heating under air to 1000° C. The char produced from this composition was completely air stable up to 1500° C.

Example 33

Catalytic hydrosilylation reaction of mixture based on 2:1 oligomeric vinyl silane terminated resin prepared from bisphenol-A6F and 1,3-dibromobenzene and combined with 50% 1,7-bis(vinyltetramethyldisiloxyl)-m-carborane) (1:2 ratio, rapid cure) cured with hydride terminated polydimethylsiloxane—A mixture formulated from the 2:1 oligomeric vinyl silane terminated resin (0.25 g, 0.55 mmol) of Example 29 was combined with 1,7-bis(vinyltetramethyldisiloxyl)-m-carborane) (0.125 g, 0.027 mmol) and hydride terminated polydimethylsiloxane (m.w. ~450 g/mol) (0.34 g) and dissolved in 1 mL of dry toluene. While stirring, a rapid cure catalyst (35 μL of 2.0-2.5% platinum-vinylmethylsiloxane complex in xylene solution) was added. The mixture was transferred to a silicone mold and was allowed to gel at room temperature (12 h). The sample was post cured above 100° C. to completely cure the resin. The result was a transparent elastomeric sample, which had good thermal and oxidative stability, retained >80% weight after heating under air to 1000° C., and exhibited a glass transition temperature below 0° C. The char produced from this composition was completely air stable up to 1500° C.

Example 34

Synthesis of 2:1 hydroxy terminated oligomer based on 1,3-dibromobenzene (excess) and bisphenol-A6F—To a 100 mL three necked flask fitted with a thermometer, a Dean-Stark trap with condenser, and nitrogen inlet were added bisphenol-A6F (3.67 g, 11.0 mmol), 1,3-dibromobenzene (2.64 mL, 5.16 g, 21.9 mmol), 1,10-phenanthroline (350 mg, 1.94 mmol) and N,N-dimethylformamide (50 mL). The resulting mixture was degassed with nitrogen for 10 min., followed by the addition of copper (I) bromide (420 mg, 2.94 mmol) and $K_2CO_3$ (7.80 g, 23.9 mmol). After filling the Dean-Stark trap with toluene and adding 5 mL to the reaction flask, the mixture was refluxed for 9-12 hr until no more water was observed being collected in the Dean-Stark trap. The remaining toluene was then removed by distillation and the reaction mixture was cooled to ambient temperature. Water was added (500 mL) to the reaction mixture. At this point, the mixture was slightly basic and 2 M HCl (300 mL) was added. The mixture was then extracted with ether (2×100 mL) and the combined ether layers were washed with 2 M HCl (1×100 mL) and water (1×100 mL). The hydroxy terminated oligomeric intermediate was dissolved into the water layer by addition of 200 mL of 10% NaOH solution. The mixture was then extracted with ether (2×100 mL) to remove impurities and the water layer was made acidic by the addition of 100 mL of 2 M HCl solution. The aqueous solution was again extracted with ether (2×100 mL) and the ether layers were combined. Carbon black (2 g) was added and the ether extract was filtered through a short plug of silica gel to remove any insoluble components. The solvent was removed and the oil was vacuum dried to yield the analytically pure 2:1 hydroxy terminated oligomer (6.35 g, 90%) as an amber colored solid.

Example 35

Synthesis of 2:1 oligomeric vinyl silane terminated resin based on 1,3-dibromobenzene (excess) and bisphenol-A6F—To a 100 mL three-necked flask fitted with a thermometer, a condenser, and a nitrogen inlet were added the oligomeric product of Example 34 (reaction of 1,3-dibromobenzene (2.81 g, 11.9 mmol) and bisphenol-A6F (2.00 g, 3.1 mmol)) and Mg ml (0.166 g, 6.82 mmol) in 25 mL of dry tetrahydrofuran. The resulting mixture was heated to reflux for 1 h and then cooled to 0° C. Vinyl(dimethylchloro)silane (0.92 ml, 6.5 mmol) was then added dropwise. The mixture was cooled, poured into water, and extracted with diethyl ether. After drying over anhydrous sodium sulfate, the solvent was removed in vacuo and the resulting oil was dissolved in 1:1 methylene chloride:hexane and filtered through a silica plug. The solvent was removed in vacuo and the clear oil was vacuum dried to yield the 2:1 oligomeric vinyl silane terminated resin (1.82 g, 90%). IR [cm$^{-1}$]: δ 3060 (C=CH), 2970 ($CH_3$), 1594 (C=C), 1498 (aromatic), 1243 (C—O), 1171 (C—O), 833 (aromatic).

Example 36

Catalytic hydrosilylation reaction of mixture based on 2:1 oligomeric vinyl silane terminated resin prepared from 1,3-dibromobenzene (excess), bisphenol-A6F, and vinyl(dimethylchloro)silane and combined with 10% 1,7-bis(vinyltetramethyldisiloxyl)-m-carborane) (2:1 ratio, rapid cure) cured with tetrakis(dimethylsiloxy)silane—A mixture of (0.30 g, 0.45 mmol) of vinyl terminated oligomeric monomer from Example 35 was combined with 1,7-bis(vinyltetramethyldisiloxyl)-m-carborane) (0.03 g, 0.065 mmol) and tetrakis(dimethylsiloxy)silane (0.06 mL) and dissolved in 1 mL of dry toluene. While stiffing, 25 μL of 2.0-2.5% platinum-vinylmethylsiloxane complex in xylene solution was added. The mixture was transferred to a silicone mold and was allowed to gel at room temperature overnight. The sample was post cured above 100° C. to completely cure the resin. The result was a transparent plastic material, which had good thermal and oxidative stability and retained >70% weight after heating under air to 1000° C. The char produced from this composition was completely air stable up to 1500° C.

Example 37

Catalytic hydrosilylation reaction of mixture based on 2:1 oligomeric vinyl silane terminated resin prepared from bisphenol-A and 4,4'-difluorobenzophenone and combined with 10 weight % 1,7-bis(vinyltetramethyldisiloxyl)-m-carborane) was cured with OctaSilane POSS® (2 moles polymeric mixture and 1 mole OctaSilane POSS®, slow cure)—A mixture formulated from the 2:1 oligomeric vinyl silane terminated resin (0.40 g, 0.49 mmol) of Example 2 was combined with 1,7-bis(vinyltetramethyldisiloxyl)-m-carborane) (0.04 g, 0.087 mmol) and OctaSilane POSS® ((($SiH(CH_3)_2$O)$SiO_{1.5}$)$_8$, 0.28 g, 0.27 mmol) and dissolved in 1 mL of dry toluene. With stirring, a slow cure catalyst (10 μL of 2.0-2.5% platinum-cyclovinylmethylsiloxane complex in xylene solution) was added. The mixture was transferred to a silicone mold and was allowed to gel at room temperature (30 min). The sample was post cured above 100° C. to completely cure the resin. The result was a transparent plastic material, which had good thermal and oxidative stability and retained >85% weight after heating under air to 1000° C. The char produced from this composition was completely air stable up to 1500° C.

Example 38

Catalytic hydrosilylation reaction of mixture based on 2:1 oligomeric vinyl silane terminated resin prepared from bisphenol-A and 4,4'-difluorobenzophenone and combined with 10 weight % 1,7-bis(vinyltetramethyldisiloxyl)-m-carborane) was cured with OctaHydro POSS® (3 moles polymeric mixture and 1 mole OctaHydro POSS®, slow cure)—A mixture formulated from the 2:1 oligomeric vinyl silane terminated resin (0.45 g, 0.56 mmol) of Example 2 was combined with 1,7-bis(vinyltetramethyldisiloxyl)-m-carborane) (0.05 g, 0.108 mmol) and OctaHydro POSS® (($HSiO_{1.5}$)$_8$, 0.08 g, 0.18 mmol) and dissolved in 1 mL of dry toluene. With stiffing, a slow cure catalyst (20 μL of 2.0-2.5% platinum-cyclovinylmethylsiloxane complex in xylene solution) was added. The mixture was transferred to a silicone mold and was allowed to gel at room temperature (15 min).

27

The sample was post cured above 100° C. to completely cure the resin. The result was a transparent plastic material, which had good thermal and oxidative stability and retained >85% weight after heating under air to 1000° C. The char produced from this composition was completely air stable up to 1500° C.

Example 39

Catalytic hydrosilylation reaction of mixture based on 2:1 oligomeric vinyl silane terminated resin prepared from bisphenol-A and 4,4'-difluorobenzophenone and combined with 10 weight % 1,7-bis(vinyltetramethyldisiloxyl)-m-carborane) was cured with OctaSilane POSS® and tetrakis(dimethylsiloxy) silane (2 moles of polymeric mixture, 1 mole of OctaSilane POSS®, and 1 mole of tetrakis(dimethylsiloxy) silane, rapid cure)—A mixture formulated from the 2:1 oligomeric vinyl silane terminated resin (0.33 g, 0.41 mmol) of Example 2 was combined with 1,7-bis(vinyltetramethyldisiloxyl)-m-carborane) (0.03 g, 0.12 mmol), OctaSilane POSS® (0.22 g, 0.22 mmol), and tetrakis(dimethylsiloxy) silane (0.07 mL) and dissolved in 1 mL of dry toluene. With stirring, a slow cure catalyst (15 µL of 2.0-2.5% platinum-vinylmethylsiloxane complex in xylene solution) was added. The mixture was transferred to a silicone mold and was allowed to gel at room temperature (2 min). The sample was post cured above 100° C. to completely cure the resin. The result was a transparent plastic material, which had good thermal and oxidative stability and retained >85% weight after heating under air to 1000° C. The char produced from this composition was completely air stable up to 1500° C.

Example 40

Catalytic hydrosilylation reaction of mixture based on 2:1 oligomeric vinyl silane terminated resin prepared from bisphenol-A and 4,4'-difluorobenzophenone and combined with 10% 1,7-bis(vinyltetramethyldisiloxyl)-m-carborane) was cured with OctaHydro POSS® and 1,1,3,3,5,5,7,7-octamethyltetrasiloxane (2 moles of polymeric mixture, 1 mole of OctaHydro POSS®, and 2 moles of 1,1,3,3,5,5,7,7-octamethyltetrasiloxane, slow cure)—A mixture formulated from the 2:1 oligomeric vinyl silane terminated resin (0.45 g, 0.56 mmol) of Example 2 was combined with 1,7-bis(vinyltetramethyldisiloxyl)-m-carborane) (0.05 g, 0.108 mmol), OctaHydro POSS® (0.08 g, 0.18 mmol), and 1,1,3,3,5,5,7,7-octamethyltetrasiloxane (0.17 g) and dissolved in 1 mL of dry toluene. With stirring, a slow cure catalyst (20 µL of 2-2.5% platinum-cyclovinylmethylsiloxane complex in xylene solution) was added. The mixture was transferred to a silicone mold and was allowed to gel at room temperature (10 min). The sample was post cured above 100° C. to completely cure the resin. The result was a transparent plastic material, which had good thermal and oxidative stability and retained >85% weight after heating under air to 1000° C. The char produced from this composition was completely air stable up to 1500° C.

Obviously, many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

28

What is claimed is:
1. A compound made by a process comprising:
providing one or more carborane-containing compounds having the formula:

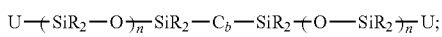

providing one or more aromatic compounds having the formula:

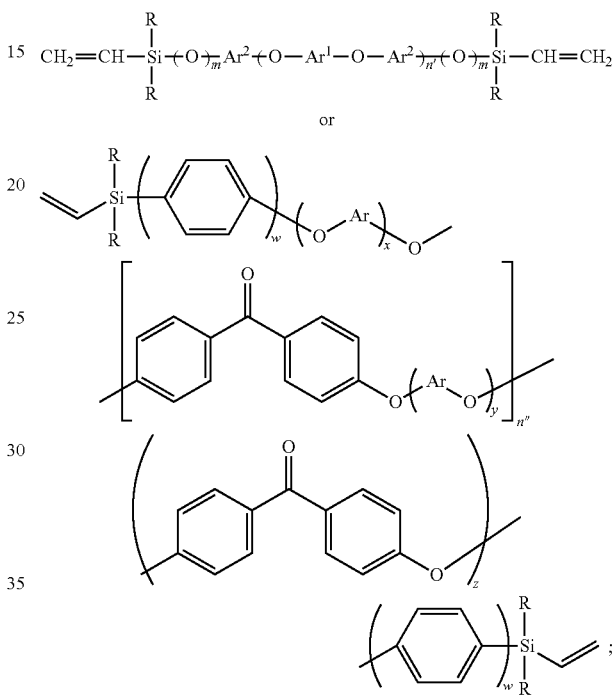

wherein each R is an independently selected alkyl, aryl, alkylaryl, haloalkyl, or haloaryl group;
wherein $C_b$ is a divalent carboranyl group;
wherein each U is an independently selected unsaturated hydrocarbon group;
wherein $Ar^1$ and $Ar^2$ are each selected from a first aromatic group and a bisphenol residue;
wherein at least one of $Ar^1$ and $Ar^2$ is the first aromatic group;
wherein each Ar is an independently selected second aromatic group;
wherein each n is an independently selected nonnegative integer;
wherein n' and n" are independently selected positive integers;
wherein m, w, x, y, and z are each independently selected from 0 and 1;
wherein if y is 0 than x and z are 0 and w is 1; and
wherein if y is 1 than x and z have different values and w equals z; and
reacting the carborane-containing compound and the aromatic compound with one or more crosslinkers having at least two silyl hydrogen atoms.
2. The compound of claim 1, wherein the carborane-containing compound is 1,7-bis(vinyltetramethyldisiloxyl)-m-carborane).

3. The compound of claim 1, wherein the aromatic compound has the formula:

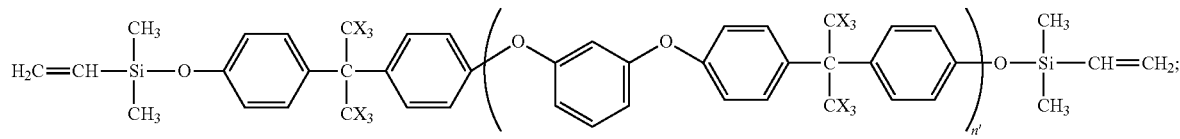

wherein X is H or F.

4. The compound of claim 1, wherein the aromatic compound has the formula:

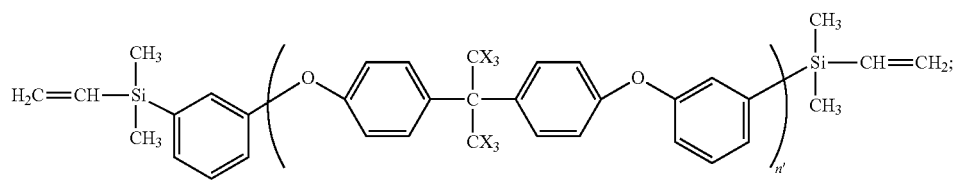

wherein X is H or F.

5. The compound of claim 1, wherein the aromatic compound has the formula:

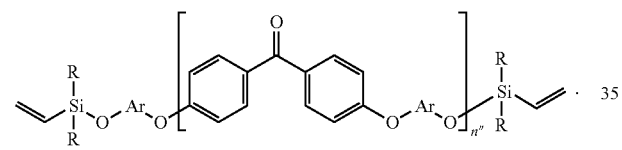

6. The compound of claim 1, wherein the aromatic compound has the formula:

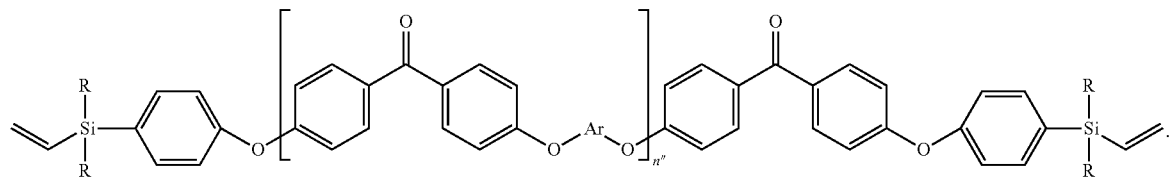

7. The compound of claim 1, wherein the aromatic compound has the formula:

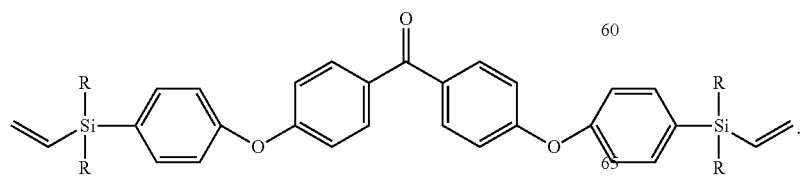

8. The compound of claim 1, wherein every Ar is a residue of 4,4'-dihydroxy-2,2-diphenylpropane; 1,1,1,3,3,3-hexafluoro-4,4'-dihydroxy-2,2-diphenylpropane; biphenol; or resorcinol.

9. The compound of claim 1, wherein the crosslinker is tetrakis(dimethylsiloxy)silane; methyl tris(dimethylsiloxy)silane; phenyl tris(dimethylsiloxy)silane; bis[(p-dimethylsilyl)phenyl]ether; diphenylsilane; 1,1,3,3-tetramethyldisiloxane; 1,1,3,3,5,5,7,7-octamethyltetrasiloxane; a hydride-terminated polydimethylsiloxane; a polyhedral oligomeric silsesquioxane having pendent silyl hydrogens; $((SiH(CH_3)_2O)SiO_{1.5})_8$; or $(HSiO_{1.5})_8$.

10. A composition comprising:
   the compound of claim 1; and
   carbon nanotubes, a clay, carbon nanofibers, a metal oxide, or microballoons.

11. A method comprising:
   providing one or more carborane-containing compounds having the formula:

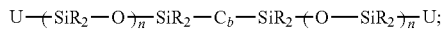

providing one or more aromatic compounds having the formula:

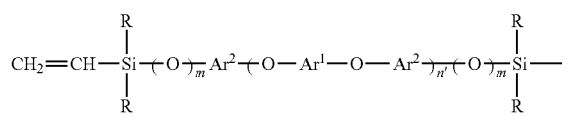

—CH=CH$_2$ or

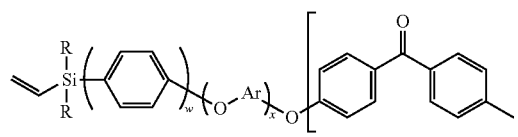

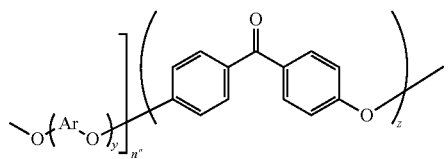

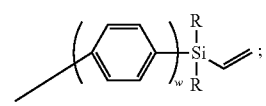

wherein each R is an independently selected alkyl, aryl, alkylaryl, haloalkyl, or haloaryl group;
   wherein $C_b$ is a divalent carboranyl group;
   wherein each U is an independently selected unsaturated hydrocarbon group;
   wherein $Ar^1$ and $Ar^2$ are each selected from a first aromatic group and a bisphenol residue;
   wherein at least one of $Ar^1$ and $Ar^2$ is the first aromatic group;
   wherein each Ar is an independently selected second aromatic group;
   wherein each n is an independently selected nonnegative integer;
   wherein n' and n" are independently selected positive integers;
   wherein m, w, x, y, and z are each independently selected from 0 and 1;
   wherein if y is 0 than x and z are 0 and w is 1; and
   wherein if y is 1 than x and z have different values and w equals z; and
   reacting the carborane-containing compound and the aromatic compound with one or more crosslinkers having at least two silyl hydrogen atoms.

12. The method of claim 11, wherein the carborane-containing compound is 1,7-bis(vinyltetramethyldisiloxyl)-m-carborane).

13. The method of claim 11, wherein the aromatic compound has the formula:

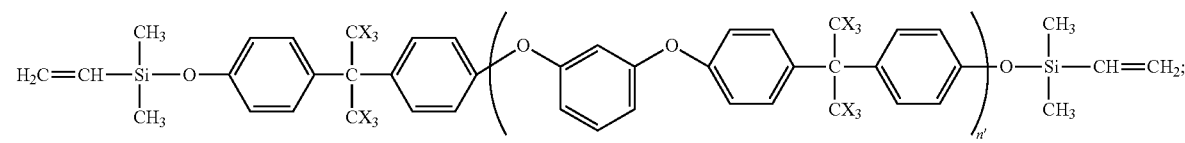

wherein X is H or F.

14. The method of claim 11, wherein the aromatic compound has the formula:

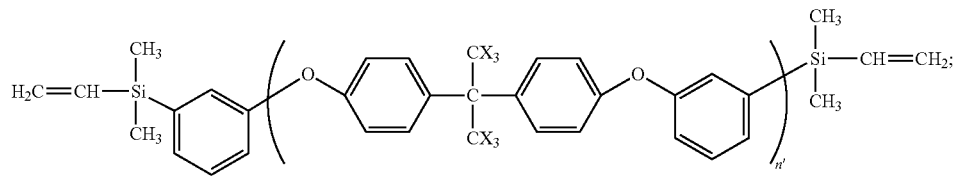

wherein X is H or F.

15. The method of claim 11, wherein the aromatic compound has the formula:

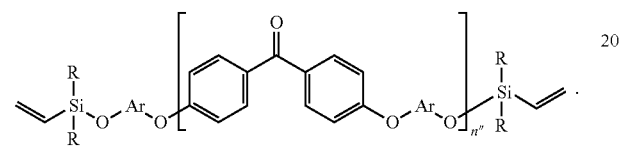

16. The method of claim 11, wherein the aromatic compound has the formula:

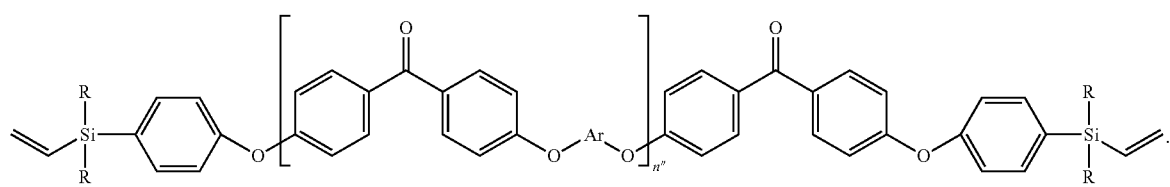

17. The method of claim 11, wherein the aromatic compound has the formula:

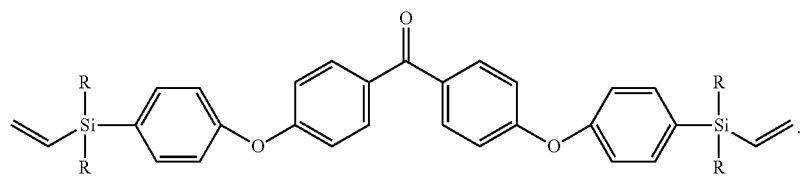

18. The method of claim 11, wherein every Ar is a residue of 4,4'-dihydroxy-2,2-diphenylpropane; 1,1,1,3,3,3-hexafluoro-4,4'-dihydroxy-2,2-diphenylpropane; biphenol; or resorcinol.

19. The method of claim 11, wherein the crosslinker is tetrakis(dimethylsiloxy)silane; methyl tris(dimethylsiloxy)silane; phenyl tris(dimethylsiloxy)silane; bis[(p-dimethylsilyl)phenyl]ether; diphenylsilane; 1,1,3,3-tetramethyldisiloxane; 1,1,3,3,5,5,7,7-octamethyltetrasiloxane; a hydride-terminated polydimethylsiloxane; a polyhedral oligomeric silsesquioxane having pendent silyl hydrogens; $((SiH(CH_3)_2O)SiO_{1.5})_8$; or $(HSiO_{1.5})_8$.

20. The method of claim 11, further comprising:
combining carbon nanotubes, a clay, carbon nanofibers, a metal oxide, or microballoons with the product of reacting the carborane-containing compound and the aromatic compound with the crosslinker.

* * * * *